(12) United States Patent
Saito et al.

(10) Patent No.: US 12,447,437 B2
(45) Date of Patent: Oct. 21, 2025

(54) CARBON DIOXIDE ADSORPTION-DESORPTION DEVICE

(71) Applicant: KABUSHIKI KAISHA TOSHIBA, Tokyo (JP)

(72) Inventors: Hitomi Saito, Tokyo (JP); Yasushi Shinjo, Kawasaki (JP); Hirohisa Miyamoto, Kamakura (JP); Reiko Yoshimura, Kawasaki (JP); Kenji Sano, Inagi (JP); Akiko Suzuki, Tokyo (JP); Toshihiro Imada, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 540 days.

(21) Appl. No.: 17/651,966

(22) Filed: Feb. 22, 2022

(65) Prior Publication Data

US 2023/0102938 A1    Mar. 30, 2023

(30) Foreign Application Priority Data

Aug. 26, 2021 (JP) ................................. 2021-138149
Jan. 21, 2022 (JP) ................................. 2022-008078

(51) Int. Cl.
*B01D 53/32* (2006.01)
*B01D 53/04* (2006.01)
(Continued)

(52) U.S. Cl.
CPC ....... *B01D 53/326* (2013.01); *B01D 53/0407* (2013.01); *B01J 20/20* (2013.01);
(Continued)

(58) Field of Classification Search
CPC .............. B01D 53/326; B01D 53/0407; B01D 2253/204; B01D 2253/25;
(Continued)

(56) References Cited

U.S. PATENT DOCUMENTS 8,377,999 B2 *   2/2013   Cote ................... B01J 20/28097
                                                         564/434
10,464,018 B2   11/2019   Voskian et al.
(Continued)

FOREIGN PATENT DOCUMENTS

GB       2567241 A  *   4/2019   ............. B01D 53/02
JP    2007-90328 A       4/2007
(Continued)

OTHER PUBLICATIONS

A.R. Blythe, "Electrical Resistivity Measurements of Polymer Materials", 1984, Polymer Testing, 4, p. 195-209. (Year: 1984).*
(Continued)

*Primary Examiner* — James Lin
*Assistant Examiner* — Kevin Sylvester
(74) *Attorney, Agent, or Firm* — Oblon, McClelland, Maier &Neustadt, L.L.P.

(57) ABSTRACT

According to one embodiment, a carbon dioxide adsorption-desorption device including an electrode that includes a porous composite is provided. The porous composite includes an electro-conductive component and a porous material on the electro-conductive component. The porous material has pores of an angstrom size or a nanometer size, and includes a moiety exhibiting redox activity according to electrical response.

13 Claims, 8 Drawing Sheets

(51) Int. Cl.
    *B01J 20/20*     (2006.01)
    *B01J 20/22*     (2006.01)
    *B01J 20/26*     (2006.01)
    *B01J 20/28*     (2006.01)

(52) U.S. Cl.
    CPC ........... *B01J 20/205* (2013.01); *B01J 20/226* (2013.01); *B01J 20/261* (2013.01); *B01J 20/28033* (2013.01); *B01J 20/28078* (2013.01); *B01D 2253/204* (2013.01); *B01D 2253/25* (2013.01); *B01D 2257/504* (2013.01); *B01J 2220/46* (2013.01); *Y02C 20/40* (2020.08)

(58) Field of Classification Search
    CPC ... B01D 2257/504; B01J 20/20; B01J 20/205; B01J 20/226; B01J 20/261; B01J 20/28033; B01J 20/28078; B01J 2220/46; Y02C 20/40
    See application file for complete search history.

(56) References Cited

U.S. PATENT DOCUMENTS

| | | | |
|---|---|---|---|
| 11,964,232 | B2 * | 4/2024 | Umeda ................. C25B 11/031 |
| 2013/0145935 | A1 | 6/2013 | Suzuka et al. |
| 2013/0157837 | A1 * | 6/2013 | Banerjee ............... B01J 20/226 977/892 |
| 2017/0113182 | A1 * | 4/2017 | Voskian .................. C25B 13/04 |
| 2017/0222231 | A1 * | 8/2017 | Kamiya .............. H01M 4/8673 |
| 2018/0236395 | A1 * | 8/2018 | Naito ...................... B01J 20/165 |
| 2018/0272313 | A1 * | 9/2018 | Shim ........................ B01J 20/22 |
| 2019/0091624 | A1 * | 3/2019 | Mansour ............ B01D 53/0423 |
| 2020/0369536 | A1 * | 11/2020 | Motkuri .................... A62D 3/38 |
| 2023/0102938 | A1 * | 3/2023 | Saito ................. B01J 20/28033 204/284 |

FOREIGN PATENT DOCUMENTS

| | | | |
|---|---|---|---|
| JP | WO 2012/144189 | A1 | 10/2012 |
| JP | WO 2016/035321 | A1 | 3/2016 |
| JP | 2017-125234 | A | 7/2017 |
| JP | 2018-533470 | A | 11/2018 |
| JP | 6551145 | B2 | 7/2019 |
| JP | 6691293 | B2 | 4/2020 |
| JP | 2022072977 | | 5/2022 |
| JP | 2023549153 | | 11/2023 |

OTHER PUBLICATIONS

Zhongyue Zhang, Hirofumi Yoshikawa, Kunio Awaga, "Monitoring the Solid-State Electrochemistry of Cu(2,7-AQDC) in a Lithium Battery: Coexistence of Metal and Ligand Redox Activities in a Metal-Organic Framework", 2014, J. Am Chem. Soc, 136, p. 16112-16115. (Year: 2014).*
Li Li, Mingqui Zhang, Wenhong Ruan, "Studies on Synergistic Effect of CNT and CB Nanoparticles on PVDF", 2015, Polymer Composites, p. 2248-2254. (Year: 2015) (Year: 2015).*
Ahmed F. M. EL-Mahdy, Cheng-Han Kuo, Abdulmohsen Alshehri, Christine Young, Yusuke Yamauchi, Jeonghun Kim, Shiao-Wei Kuo, "Strategic design of triphenylamine- and triphenyltriazine-based two-dimensional COF for CO2 uptake and energy storage", 2018, J. Mater. Chem. A, 6, p. 19532-41. (Year: 2018).*
Onur Yildirim, Matteo Bonomo, Nadia Barbero, Cesare Atzori, Bartolomeo Civalleri, Francesca Bonino, Guido Viscardi and Claudia Barolo, "Application of Metal-Organic Frameworks and Covalent Organic Frameworks as (Photo)Active Material in Hybrid Photovoltaic Technologies", 2020, Energies, 13, p. 5602. (Year: 2020).*
Hesham R. Abuzeid, Ahmed F.M. EL-Mahdy, Shiao-Wei Kuo, "Covalent organic frameworks: Design principles, synthetic strategies, and diverse applications", 2021, Giant, 6, p. 1-27. (DOI:// 10.1016/j.giant.2021.100054) (Year: 2021).*
Yan et al.. Fabrication of heterostructured UIO-66-NH2/CNTs with enhanced activity and selectivity over photocatalytic CO2 reduction. Int. J. Hydrogen Energy, 2020, 45(55), 30634-30646. (Year: 2020).*
Albo et al. ("Towards the electrochemical conversion of carbon dioxide into methanol", Green Chemistry 2015, 17, 2304-2324) ( Year: 2015).*
Li et al. ("Ultralight covalent organic framework/graphene aerogels with hierarchical porosity", Nature Comm. 2020, 11, article 4712, p. 1-8) + supporting information (Year: 2020).*
Liu et al. ("Electrochemically mediated carbon dioxide separation with quinone chemistry in salt-concentrated aqueous media", Nature Comm. 2020, 11, article 2278, p. 1-11) (Year: 2020).*
Roque et al. ("Porous hexacyanocobaltates(III): Role of the metal on the framework properties", Microporous and Mesoporous Materials 2007, 103, 57-71) (Year: 2007).*
Tang et al. "Mechanism of electrochemical lithiation of a metal-organic framework without redox-active nodes", J. Chem. Phys. 2016, 144, article 194702) (Year: 2016).*
Ding et al. ("Controlled Intercalation and Chemical Exfoliation of Layered Metal Organic Frameworks Using a Chemically Labile Intercalating Agent", J. Am. Chem. Soc. 2017, 139, 9136-9139 and supporting information) (Year: 2017).*
Zhang et al. ("Nanopore-induced host-guest charge transfer phenomena in a metal-organic framework", Chem. Sci. 2018, 9, 3282-3289 and supporting information) (Year: 2016).*
Fan et al. ("A Universal Strategy toward Ultrasmall Hollow Nanostructures with Remarkable Electrical Performance", Angew. Chem. Int. Ed. 2020, 59, 8247-8254) (Year: 2020).*
Jun Yan, Ton Wei, Bo Shao et al. ("Electrochemical properties of graphene nanosheet/carbon black composites as electrodes for supercapacitors.", Carbon, 2010, 48, 1731-1737) (Year: 2010).*
Ojwang ("Prussian blue analogue copper hexacyanoferrate", 2017, dissertation from Stockholm University Department of Materials and Environmental Chemistry, p. 1-79). (Year: 2017).*
Zhang et al. ("Discovery of a "Bipolar Charging" Mechanism in the Solid-State Electrochemical Process of a Flexible Metal-Organic Framework," Chem. Mater. 2016, 28, 1298-1303 and supporting information) (Year: 2016).*
Chandra et al. "Molecular Level Control of the Capacitance of Two-Dimensional Covalent Organic Frameworks: Role of Hydrogen Bonding in Energy Storage Materials", Chemistry of Materials, 29, 5, DOI: 10.1021/acs.chemmater.6b04178, 2017, 7 Pages.
Kong et al. "Redox Active Covalent Organic Framework-Based Conductive Nanofibers for Flexible Energy Storage Device", Carbon 171, https://doi.org/10.1016/j.carbon.2020.09.003, 2021, 9 Pages.
Li et al. "Skeleton Engineering of Isostructural 2D Covalent Organic Frameworks: Orthoquinone Redox-Active Sites Enhanced Energy Storage", CCS Chem., 2, DOI: 10.31635/ccschem.020.202000257, 2020, 11 Pages.
Sun et al. "A Bifunctional Covalent Organic Framework as an Efficient Platform for Cascade Catalysis", Materials Chemistry Frontiers, 1, DOI: 10.1039/c6qm00363j, 2017, 7 Pages.
Vitaku et al. "Phenazine-Based Covalent Organic Framework Cathode Materials with High Energy and Power Densities", J. Am. Chem. Soc., 142, 2020, 5 Pages.
Wang et al. "Phenanthroline Covalent Organic Framework Electrodes for High-Performance Zinc-Ion Supercapattery", ACS Energy Lett., 5, 2020, 9 Pages.
Fang et al. "Designed Synthesis of Large-Pore Crystalline Polyimide Covalent Organic Frameworks", Nature Communications, 5:4503 | DOI: 10.1038/ncomms5503, 2014, 8 Pages.
Celis-Salazar et al. "Proton-Coupled Electron Transport in Anthraquinone-Based Zirconium Metal-Organic Frameworks", Inorg. Chem., 56, 22, 2017, 26 Pages.
Zhang et al. "Monitoring the Solid-State Electrochemistry of Cu(2,7-AQDC) (AQDC=Anthraquinone Dicarboxylate) in a Lithium Battery: Coexistence of Metal and Ligand Redox Activities in a Metal-Organic Framework", J. Am. Chem. Soc., 136, dx.doi.org/ 10.1021/ja508197w, 2014, 4 Pages.

(56) References Cited

OTHER PUBLICATIONS

Zhang et al. "Discovew of a "Bipolar Charging" Mechanism in the Solid-State Electrochemical Process of a Flexible Metal-Organic Framework", Chemistry of Materials, 28, DOI: 10.1021/acs. chemmater.5b04075, 2016, 6 Pages.

Voskian et al. "Faradaic Electro-Swing Reactive Adsorption for $CO_2$ Capture", Energy Environ. Sci., 12, DOI: 10.1039/09ee02412c, 2019, 18 Pages.

Zhu et al. "Crystallization of Covalent Organic Frameworks for Gas Storage Applications", Molecules, 22, 1149; doi:10.3390/molecules22071149, 2017, 29 Pages.

Jiang et al. "Recent Advances in Lithium-Based Batteries Using Metal Organic Frameworks as Electrode Materials", Electrochemistry Communications, 122, 106881, https://doi.org/10.1016/j.elecom.2020.106881, 2021, 23 Pages.

Eguchi et al. "Study on Electronic Structure of Metal-Organic Framework by Photoelectron Spectroscopy", Kyushu Synchrotron Optical Research Center Prefectural Beamline Usage Report, Issue number: 1707066F, 2017, 7 Pages (with English abstract & Machine generated English translation).

Office Action mailed on Jan. 7, 2025, in corresponding JP Patent Application No. 2022-008078 (with English translation).

\* cited by examiner

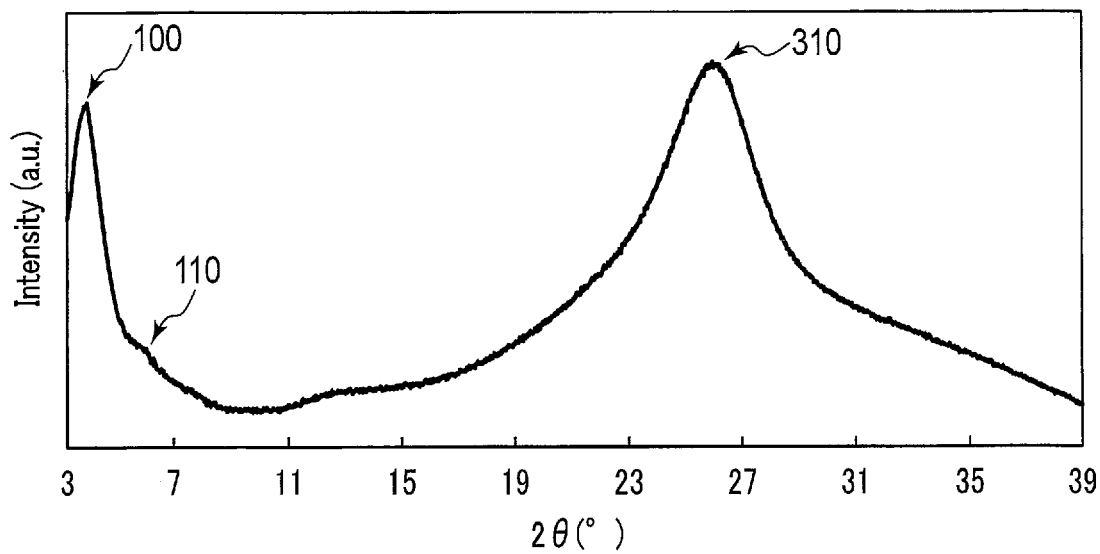
F I G. 4
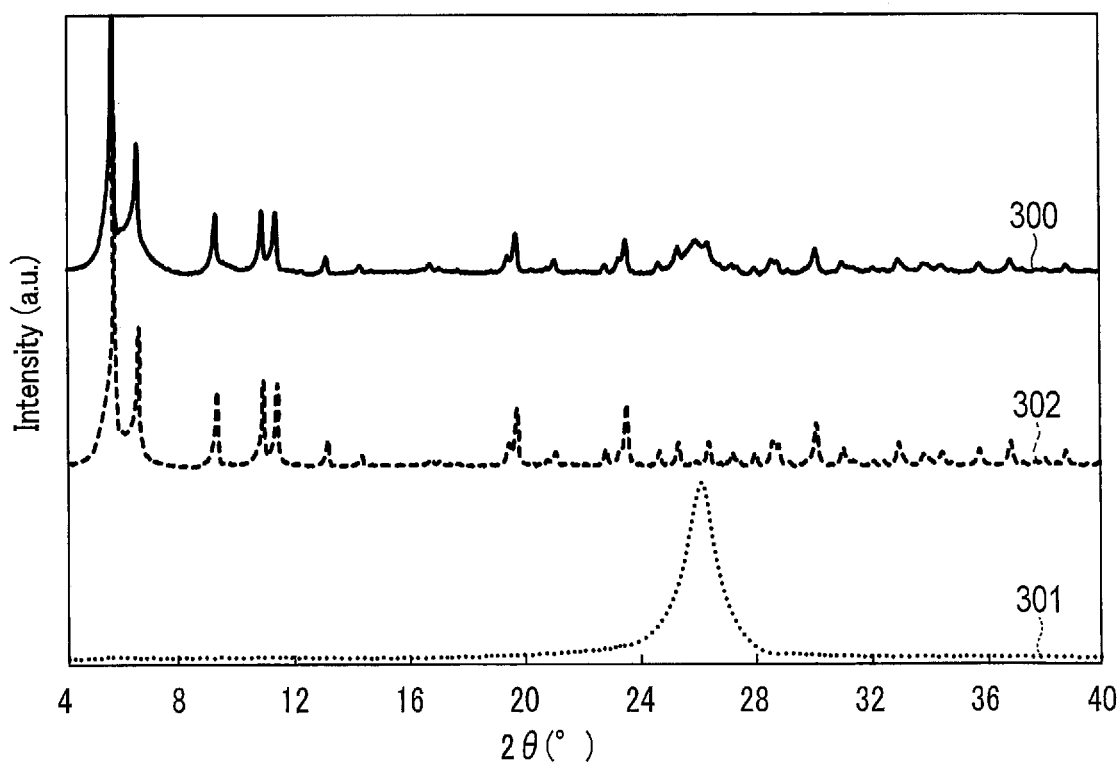
F I G. 5

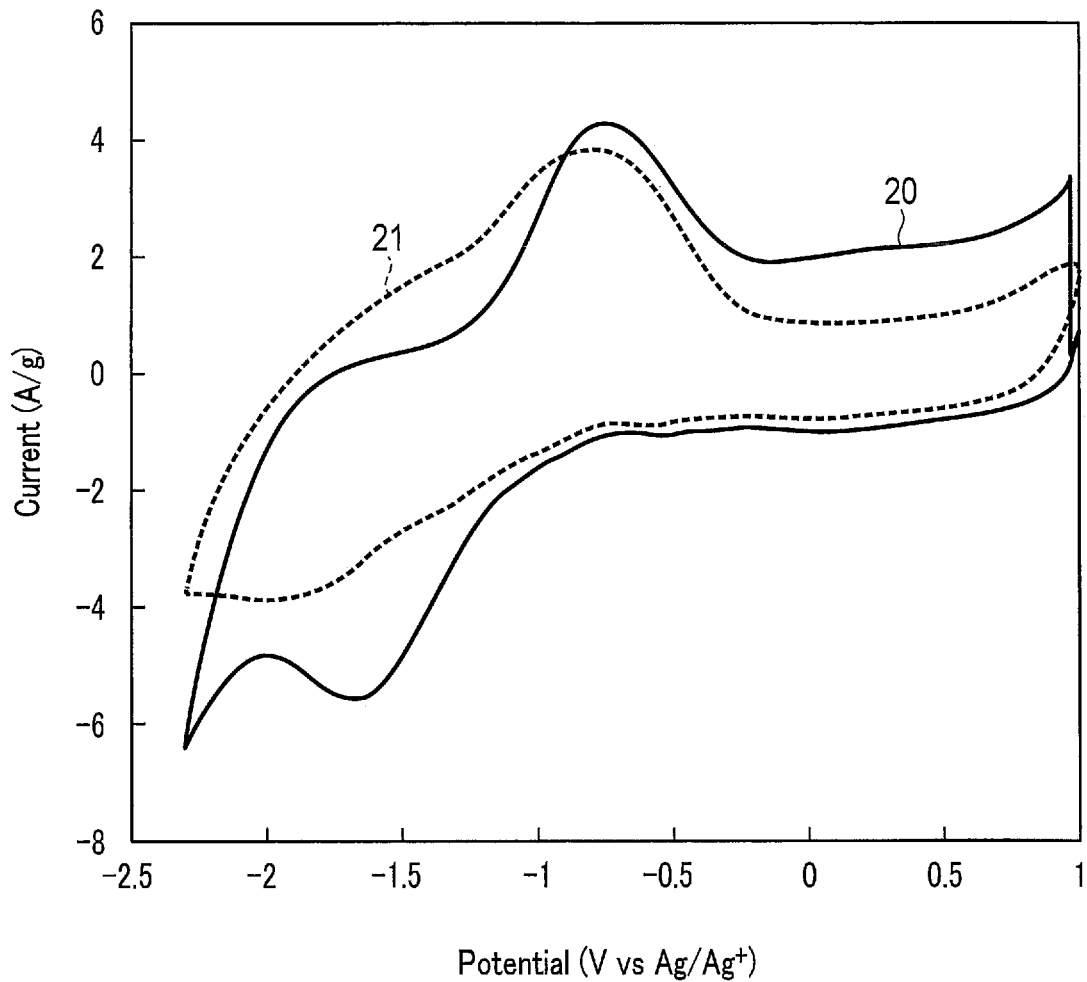
F I G. 11

CARBON DIOXIDE ADSORPTION-DESORPTION DEVICE

CROSS-REFERENCE TO RELATED APPLICATION

This application is based upon and claims the benefit of priority from prior Japanese Patent Application No. 2021-138149, filed. Aug. 26, 2021, and No. 2022-008078, filed Jan. 21, 2022, the entire contents of all of which are incorporated herein by reference.

FIELD

Embodiments described herein relate generally to a carbon dioxide adsorption-desorption device.

BACKGROUND

A technique for causing carbon dioxide to be absorbed into an absorbent such as an amine is used in a carbon dioxide capture and storage (CCS) plant such as a thermal power plant, and is regarded as a most promising candidate as a technique for global warming prevention. The absorbent that has absorbed carbon dioxide is generally heated in a regeneration tower, thereby being regenerated by releasing the carbon dioxide, and repeatedly used. A general temperature for heating at this time is about 140° C., consuming great energy. Heat and energy required for regeneration are also called heat duty or energy penalty. If this heating temperature can be lowered to efficiently release carbon dioxide, energy reduction can be achieved, allowing promotion of the spread of this technique as a technique for global warming prevention.

In addition, it is also known to use a porous material as a carbon dioxide adsorbent. Since a porous material has a relatively large specific surface area, the applications such as gas storage, gas separation, catalyst, and reaction field are being considered by selecting a suitable pore size and/or an organic group with high carbon dioxide affinity to adsorb a large amount of gas or organic molecules. As porous materials, there are known zeolite, porous silica, porous alumina, porous carbon materials, metal-organic frameworks (MOF), covalent-organic frameworks (COF), porous materials obtained by modifying pores of these porous materials with amine molecules, and the like. Even when such a porous material is used, the carbon dioxide adsorbent is basically regenerated by heating, and energy saving is required similarly to an absorbent such as an amine.

As an energy-saving regeneration method, there is a method by which adsorbed carbon dioxide is substituted with water vapor. Carbon dioxide is released from the adsorbent by a substitution reaction of adsorbed carbon dioxide with water vapor. According to this method, the heating temperature can be lowered to 100° C. or lower, but water vapor is contained in the released gas in addition to carbon dioxide. Therefore, the process of cooling the released gas and condensing the water vapor, to thereby separate the water vapor from the carbon dioxide is added at a subsequent stage. Therefore, although energy saving can be achieved as compared with thermal desorption, the method can hardly be said to be optimal as a method for regenerating an absorbent.

On the other hand, there has also been studied a technique of separating carbon dioxide by switching between electrical potentials, instead of heating, using a polymer containing electroactive groups. By using this method, carbon dioxide can be released without heating, so that the effect of energy saving can be expected. However, since the polymer does not have pores like zeolite and has a small surface area, the utilization factor of the electroactive groups is small.

BRIEF DESCRIPTION OF THE DRAWINGS

FIG. 4 is a graph showing an X-ray diffraction spectrum of a porous composite produced in Example 2;

FIG. 5 is a graph showing X-ray diffraction spectra of a porous composite produced in Example 12 and raw materials thereof;

FIG. 11 is a graph showing cyclic voltammetry curves of the porous composite prepared in Example 2.

DETAILED DESCRIPTION

Figure 1:
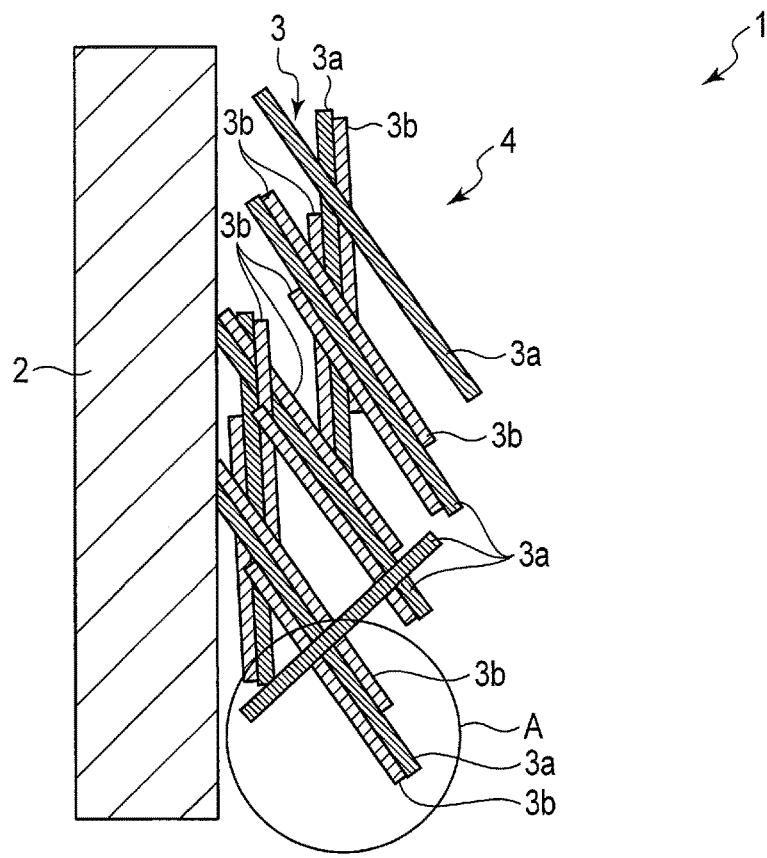
FIG. 1 is a schematic cross-sectional view illustrating an example of a carbon dioxide adsorption-desorption device according to an embodiment.

According to one embodiment, a carbon dioxide adsorption-desorption device including an electrode that includes a porous composite is provided. The porous composite includes an electro-conductive component and a porous material on the electro-conductive component. The porous material has pores of an angstrom size or a nanometer size, and includes a moiety exhibiting redox activity according to electrical response.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

Embodiments described below relate to a device and a method for separating carbon dioxide from a gas containing the carbon dioxide by an electrochemical process. The device is an electrically responsive device that efficiently releases carbon dioxide.

[Carbon Dioxide Adsorption-Desorption Device]

The carbon dioxide adsorption-desorption device according to the embodiment includes an electrode including a porous composite. The porous composite includes an electro-conductive component and a porous material on the electro-conductive component. The porous material has angstrom sized ($10^{-10}$ m) or nanometer sized ($10^{-9}$ m) pores, and within the pores, the porous material includes moiety that exhibit redox activity according to electrical response.

The carbon dioxide adsorption-desorption device is a device with which carbon dioxide is adsorbed to and desorbed from the moieties by varying an electrical potential applied to the device. By such a device using a composite material that adsorbs and desorbs carbon dioxide with redox-active moieties, carbon dioxide can be absorbed and released at room temperature. In addition, since using porous materials increases the surface area, the density of electrical response active reaction points can be made higher than that of electroactive polymer. Therefore, the device can absorb and release carbon dioxide with low energy.

Such a device can suitably absorb carbon dioxide as described above, and can be suitably applied to an apparatus for recovering carbon dioxide from factory exhaust gases or the atmosphere.

According to an embodiment, there is provided a device that performs gas adsorption and desorption with an electrochemical swing (i.e., electro-swing adsorption). The electrochemical swing process is a process of maintaining a specific potential in the forward direction and maintaining a different potential in the reverse direction. In this method, by using redox-active groups that can be oxidized at a certain potential and reduced at a different potential, it is possible to adjust affinity for a target adsorption substance. According to the embodiment, energy is efficiently delivered to act on an electrochemical reaction that results in capture of a target substance (for example, $CO_2$).

The electrode may further include a current collector on which the porous composite is provided. The porous composite may be supported on the current collector. For example, the porous composite may be formed on a current collector surface. Alternatively, the porous composite may be held, for example, by a mesh-shaped current collector.

The current collector can function as a conductor for transferring charge to the porous composite to cause the redox-active moieties to electrically respond. By varying the electrical potential of the current collector, the redox-active moieties contained in the porous composite can be oxidized and reduced, thereby allowing carbon dioxide to be adsorbed to and desorbed from the moieties.

The porous composite includes an electro-conductive component and a porous material having pores of an angstrom size or a nanometer size. In the porous composite, the porous material is on a surface of the electro-conductive component. The porous material includes moieties that exhibit redox activity associated with electrical response. These moieties may be, for example, organic functional groups whose redox state changes according to the application of a charge, namely, redox-active groups exhibiting an electrical response. The moieties may be included, for example, on the surface of the porous material. The surface of the porous material herein includes inner surfaces (pore wall surfaces) of the pores in addition to an outer surface on the outer periphery.

The porous composite can be obtained by combining the electro-conductive component and the porous material. The compositing is performed, for example, by mixing the electro-conductive component and the porous material or modifying (covering) the surface of the electro-conductive component with the porous material.

In the porous composite, the moieties exhibiting redox activity through electrical response are preferably close to or in contact with the nearby electro-conductive component. Therefore, it is preferable that the porous material covers at least a part of the surface of the electro-conductive component, or the porous material is attached to the electro-conductive component. For example, the porous material may include a covalent-organic framework (COF) having electrical responsiveness or a metal-organic framework (MOF) having electrical responsiveness, which are described later, and the COF or MOF may be included in the porous composite in such a manner where the COF or MOF covers the electro-conductive component.

The presence of a COF or MOF in the composite is examined in two stages. First, thermogravimetric analysis (TG) is performed under an inert atmosphere. If the first weight loss between 200° C. and 300° C., which is attributed to a binder component, and the second weight loss between 300° C. and 500° C. are observed, a COF or MOF is assumed to be present in the composite. The electro-conductive component, partially covered with porous material such as COF or MOF, does not decompose until around 1000° C. in inert atmosphere. X-ray diffraction (XRD) analysis is performed only if the weight loss is observed between 300° C. and 500° C. When it is confirmed that one or two diffraction peaks derived from a COF or MOF appear in the range of 3° to 10° in addition to the diffraction peak derived from the electro-conductive component (20° to 30°), it is determined that the composite includes a COF or MOF.

The presence of a COF or MOF on the surface of the electro-conductive component is examined by a scanning transmission electron microscope (STEM). If it is confirmed by STEM observation that a layer different from the electro-conductive component is stacked on the surface of the electro-conductive component, it is direct evidence that the surface is covered.

Both the COF and the MOF can be included in the porous composite. Namely, the porous composite may include at least either the COF or MOF. Also for the case where both the COF and the MOF are included in the porous composite, the analysis results are similar to those described above.

It is preferable that the porous material thinly covers the surface of the electro-conductive component with a thickness of 1 nm or more and 5 nm or less. The thinner the porous material covers the electro-conductive component, the greater the electrical conductivity of the porous composite, whereby the active reaction points for adsorbing and desorbing $CO_2$ increase. Although MOF and COF originally have very large specific surface areas and can contain many active reaction points, MOF or COF alone has electrical paths only near the surface because the electrical conductivity thereof is not as high as metal. Therefore, since the internal active reaction points cannot contribute to $CO_2$ adsorption and desorption, there is a high possibility that the high specific surface area is not utilized. In order to take advantage of the high specific surface area of the MOF or the COF, which provides a high active reaction point density, for example, it is desirable for MOF or the COF to bind directly to the surface of electro-conductive component to make electrical conduction pass effectively, and it is preferable to thinly cover the surface of the electro-conductive component. Furthermore, by covering the electro-conductive component having a large specific surface area with the porous material, a further increase in the specific surface area can be expected. An example of the electro-conductive component having a large specific surface area is a material having a linear or planar shape, and a specific example is carbon nanotube (CNT). As such, the degree of covering or adhesion of the porous material onto the electro-conductive component can be estimated from the specific surface area of the porous composite.

The specific surface area of the porous composite can be evaluated by a method by which molecules having a known adsorption occupancy area are adsorbed onto the surface of powder particles, and the specific surface area of the sample is determined from the amount of the molecules. For example, if the porous composite is provided on the current collector, just the composite portion is scraped off as much as possible from the current collector, and the collected powder is subjected to vacuum degassing at 120° C. for eight hours with the pretreatment device BELPREP-VAC II manufactured by MicrotracBEL Corp. Thereafter, the specific surface area is measured at an adsorption temperature of 77 K using the specific surface area/pore distribution analyzer BELSORP-MINI II manufactured by Microtrac-BEL Corp. As the gas to be adsorbed, for example, nitrogen is used.

The specific surface area of the porous material itself is preferably large. The redox-active moieties contained in the porous material are negatively charged at a reduction potential, and can chemically adsorb carbon dioxide. The more the opportunities for the moieties to come into contact with carbon dioxide, the more the adsorption amount increases. Therefore, it is preferable to use a porous substance having a specific surface area of about 10 $m^2/g$ to several thousand $m^2/g$ as the porous material. This makes it possible to obtain a device that is compact and capable of absorbing and releasing a large amount of carbon dioxide.

The electrode including the porous composite contained in the carbon dioxide adsorption-desorption device may further include a second electro-conductive component in addition to the electro-conductive component included in the porous composite. The electrical connection between the porous composites can be reinforced by separately adding the second electro-conductive component in addition to the first electro-conductive component included in the porous composite. When the electrode includes a current collector, the electrical connection between the porous composite and the current collector can also be reinforced. Examples of the second electro-conductive component include carbon materials such as carbon nanotubes, graphite, graphene, carbon fiber, and Ketjen black. The second electro-conductive component preferably has a shape that easily enters into a small gap. Therefore, rather than a fibrous carbon material, a tubular or particulate carbon material having a long diameter of about several μm is more preferable as the second electro-conductive component. The same electro-conductive component as the first electro-conductive component may be used as the second conductive component.

The electrode may further include a component that physically entangles porous composites, providing reinforcement. Examples of such a structure reinforcing component includes fibrous carbon materials, electro-conductive inorganic-organic hybrid materials, electro-conductive polymers, non-electro-conductive polymers, and ion-conductive polymers. The structure reinforcing component preferably has a shape of fine fibers advantageous for entangling the porous composites, and more preferably is electrically conductive. For providing physical reinforcement, a length of the structure reinforcing component is preferably 1 μm or more. As the structure reinforcing component, for example, carbon nanofiber, polyaniline, polythiophen, poly(3,4-ethylenedioxythiophene)-polystyrene sulfonate (PEDOT:PSS), polyvinylidene fluoride (PVdF), polymethyl methacrylate (PMMA), polyimide (PI), polyethylene oxide, polypropyl oxide, polyacrylonitrile, and polyvinyl chloride may be used. Inclusion of the structure reinforcement component also makes possible the use of the porous composite as a free-standing sheet-shaped composite electrode without a current collector. One or more component included in the electrode may serve as the structure reinforcing component.

The electrode may further include a binder. The binder may or may not be included. The binder can bind, for example, the current collector, the porous composite, and optionally the second electro-conductive component. As the binder, for example, polyvinylidene fluoride (PVdF), polymethyl methacrylate (PMMA), or polyimide (PI) may be used.

In addition, when an electrically non-conductive polymer as the binder is dispersed in a state of fine fibers among the porous composites, the binder can also provide action as the above structure reinforcing component.

The carbon dioxide adsorption-desorption device may further include an electrolyte held in the porous composite. The electrolyte may be contained, for example, in pores of the porous composite. By including the electrolyte, electrical conductivity is improved, and the ability to absorb and release $CO_2$ is enhanced.

The electrode including the porous composite, which is included in the device, is used as a working electrode, and an electrical potential is applied to the working electrode to apply a charge to the redox-active moieties included in the porous composite. As such, by controlling the potential of the electrode, the redox state of the porous material included in the porous composite is switched between the oxidation state and the reduction state. The porous material can adsorb carbon dioxide in the reduction state and can desorb carbon dioxide in the oxidation state.

For example, the potential can be applied to the working electrode by using a counter electrode to the working electrode (the electrode having the porous composite) and applying a voltage between these electrodes. For example, the carbon dioxide adsorption-desorption device may include a counter electrode to the electrode included in the device. Namely, as the carbon dioxide adsorption-desorption device, an electrochemical cell using the working electrode and the counter electrode may be configured. Aspects of the device are not limited to electrochemical cells. A specific example of the electrochemical cell is a three-electrode cell further including a reference electrode in addition to the working electrode and the counter electrode.

Figure 2:
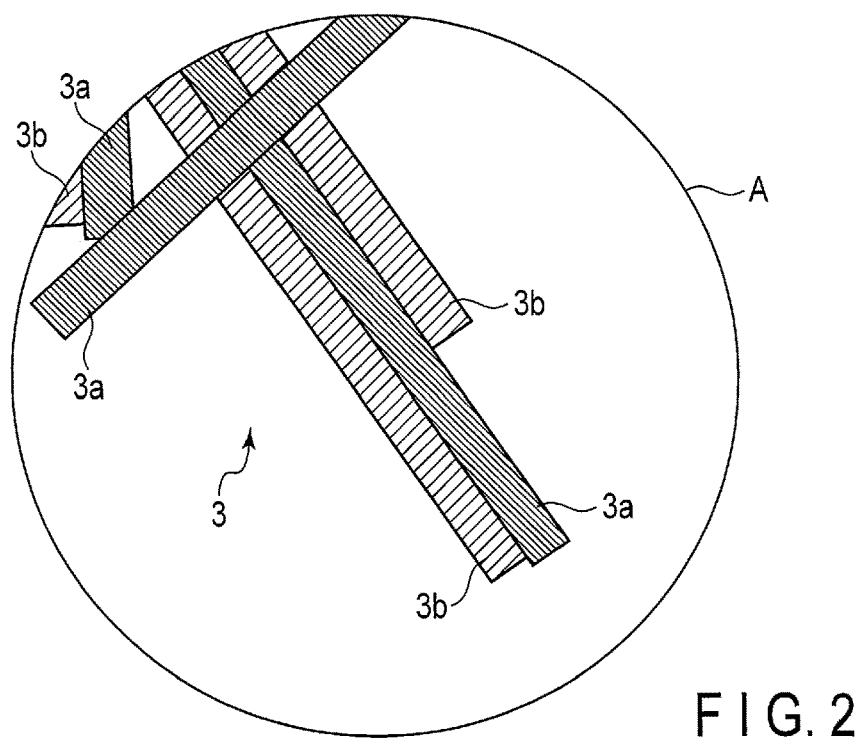
FIG. 2 is an enlarged cross-sectional view of section-A illustrated in FIG. 1.

A specific example of a carbon dioxide adsorption-desorption device according to the embodiment will be described with reference to FIGS. 1 and 2. FIG. 1 is a schematic cross-sectional view of an example of a carbon dioxide adsorption-desorption device according to the embodiment. FIG. 2 is an enlarged cross-sectional view of section-A illustrated in FIG. 1.

A carbon dioxide adsorption-desorption device 1 includes an electrode 4 including a current collector 2 and a porous composite 3. The current collector 2 has a flat plate shape, and the porous composite 3 is provided on one principal surface thereof. In the illustrated example, the porous composite 3 is provided only on one surface of the current collector 2, but the porous composite 3 may be provided on plural surfaces of the current collector 2. Alternatively, the current collector 2 need not have a flat plate shape and, for example, the porous composite 3 may be entered into a mesh-shaped current collector 2. The current collector 2 may be omitted.

The porous composite 3 includes electro-conductive components 3*a* and porous materials 3*b*. The porous materials 3*b* are provided on the electro-conductive components 3*a*.

Hereinafter, the current collector, the electro-conductive component, the porous material, and the electrolyte will be described in detail.

(Current Collector)

As the current collector, carbon or metal may be used. As the current collector has better electrical conductivity and a larger surface area, charges can be transferred to redox-active moieties effectively. The types of the carbon include glassy carbon, a graphite sheet, carbon felt, carbon cloth, a carbon mesh, carbon paper, and a carbon sheet with a gas diffusion layer. The types of the metal include a copper plate, a copper sheet, a copper mesh, an aluminum plate, an aluminum sheet, an aluminum mesh, a nickel plate, a nickel sheet, and a nickel mesh. The types of carbon and metal are not limited to the above.

(Electro-Conductive Component)

For the electro-conductive component (first conductive component) of the porous composite, for example, a carbon material having good electrical conductivity may be used. Examples of the first electro-conductive component include, for example, one or more selected from the group consisting of carbon nanotube, graphite, graphene, carbon nanofiber, and Ketjen black. The shape of the first electro-conductive component is preferably linear or flat in order to increase the contact probability, and is preferably a rod shape, a tubular shape, a fiber shape, a sheet shape, or a flake shape. For the second electro-conductive component outside the porous composite, for example, a carbon material having good electrical conductivity such as carbon nanotube, graphite, graphene, carbon nanofiber, carbon fiber, or Ketjen black may be used. The second electro-conductive component preferably has a shape that easily enters into a small gap such as a tubular shape or a particulate shape. Each of the first and second electro-conductive components may be one type or may be a mixture of plural types.

The above electro-conductive component includes components that can serve as the above-mentioned structure reinforcing component that physically reinforces the porous composite. The shape of the electro-conductive component that also acts as the structure reinforcing component is preferably a fine fiber shape of few nanometers to few hundred nanometers in diameter and few micrometers to few tens of micrometers in length, so as to efficiently intermingle with the porous composite. For example, an electro-conductive material of 1 μm or more in length as the electro-conductive component can entangle the porous composite and provide physical reinforcement. Such an electro-conductive material may have a length of 20 μm or less. The diameter of such an electro-conductive material is preferably 200 nm to 800 nm. As the electro-conductive component that can physically reinforce the porous composite, for example, one or more selected from the group consisting of carbon nanofiber, polyanilene, polythiophene, and PEDOT: PSS may be used. The electro-conductive component may include an electro-conductive material with a length less than 1 μm that does not exhibit the action of physical reinforcement, together with the long electro-conductive material like those described above. Such a short electro-conductive material may have a length (or longest dimension, such as the long diameter) of 500 nm or more, for example.

(Porous Material)

The porous material used in the carbon dioxide adsorption-desorption device includes a porous substance having a large number of pores. The pore diameter of the pores is preferably 5 nm or less. Specifically, the porous material is preferably formed of a sub-nanoporous material or a nanoporous material having pores of an angstrom size (1 nm or less) to a nanometer size, and more specifically, 0.5 nm or more and 5 nm or less.

The porous material includes moieties that are reduced by electrical response to bond to carbon dioxide and is oxidized by electrical response to release the bond to carbon dioxide. Such moieties may be organic molecules included as functional groups in the molecular structure composing the porous material. Such organic molecules may be arbitrarily selected from those known that exhibit redox reactions and used. Furthermore, derivatives of these organic molecules may also be used. Specific examples will be given later.

The porous material includes the electrically responsive redox-active moieties on the surface. The surface of the porous material as referred to herein includes the outer surface and pore surfaces of the porous material. The moieties may be located on the outer surface of the porous material. In addition, the moieties may be included in the pores in a state of being embedded in the pore surfaces of the porous material. Alternatively, the moieties may be included in the pores in a state of hanging from the pore surfaces of the porous material. The state of hanging from the pore surfaces of the porous material refers to, for example, the state in which the moieties protrude from the pore surfaces of the porous material and hang like a pendant. The state in which the moieties are embedded in the pore surface herein refers to, for example, the state in which crosslinked (bridged) functional groups (the moieties) whose redox state varies due to electrical response are included in portions corresponding to the wall surfaces of the pores among the molecular structure composing the porous material. The state in which the moieties hang from the pore surfaces refers to, for example, the state in which pendant functional groups whose redox state varies due to electrical response are bonded to portions corresponding to the wall surfaces of the pores in the molecular structure composing the porous material.

Figure 3:
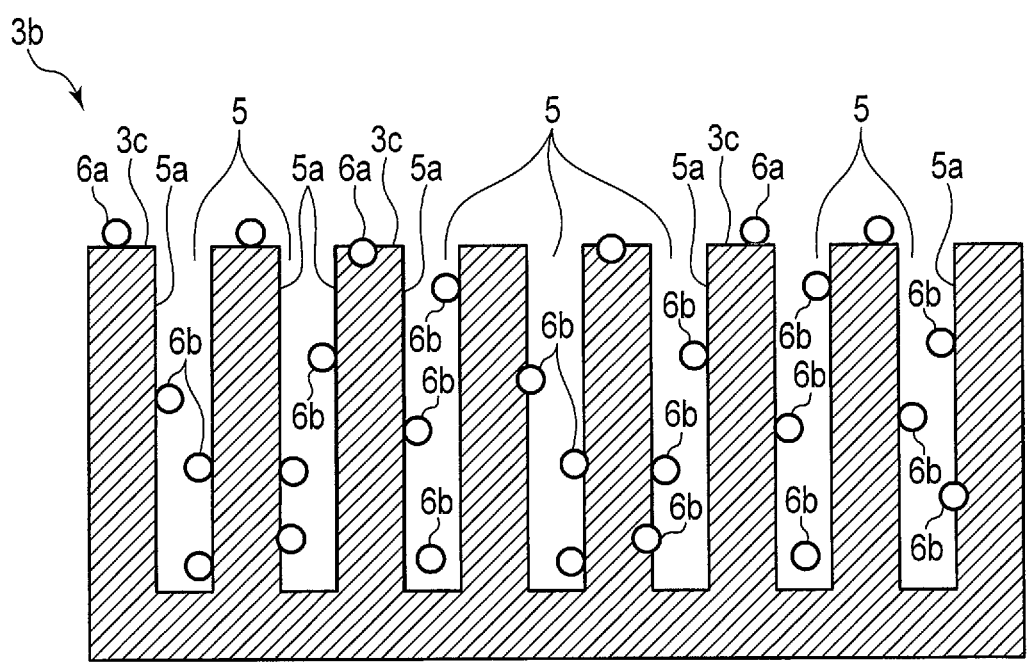
FIG. 3 is a schematic cross-sectional view illustrating an example of a porous material included in the carbon dioxide adsorption-desorption device according to the embodiment.

The arrangement of moieties in the porous material will be described with reference to the drawing. FIG. 3 is a schematic cross-sectional view illustrating an example of a porous material included in the carbon dioxide adsorption-desorption device according to the embodiment. The illustrated porous material $3b$ includes plural pores 5. The porous material $3b$ includes first moieties $6a$ on a porous material surface $3c$ outside the pores 5 and second moieties $6b$ on pore surfaces $5a$ which are wall surfaces inside the pores 5. Some of the first moieties $6a$ and second moieties $6b$ are embedded in the surfaces (the porous material surface $3c$ or the pore surfaces $5a$) of the porous material $3b$ or hang from the surfaces.

The content of the moieties exhibiting redox activity according to electrical response contained in the porous material is preferably 10 mass % or more to 80 mass % or less, and more preferably 20 mass % or more to 75 mass % or less, with respect to the total mass of the porous material.

In general, the larger the amount of the active groups contained in the adsorbent, the larger the adsorption amount and desorption amount of carbon dioxide per unit volume of the adsorbent. Therefore, from the viewpoint of energy consumption, the size of plant equipment, and treatment efficiency, it is desirable that the amount of active groups is large.

However, if the amount of the redox-active moieties per unit volume of the porous material is too large, the redox-active groups are close to each other, whereby pores are blocked or carbon dioxide can hardly accesses the active groups, and as a result, there is a possibility that the active groups cannot be sufficiently utilized. The content of the moieties exhibiting redox activity due to electrical response contained in the porous material is preferably 90 mass % or less with respect to the total mass of the porous material. The content ratio is more preferably 75 mass % or less.

By setting the content of the moieties to 10 mass % or more, sufficient adsorption amount and adsorption rate of carbon dioxide can be obtained, and excellent treatment efficiency can be obtained. Therefore, the porous material in which the content of the redox-active moieties is within the above range is advantageous for use in carbon dioxide recovery in that, since the porous material has not only a large carbon dioxide adsorption amount and a high carbon dioxide adsorption rate, but also has a large carbon dioxide desorption amount and a high carbon dioxide desorption rate (reaction rate), whereby recovery of carbon dioxide can be performed efficiently.

Specific examples of the organic molecules capable of functioning as redox-active moiety that electrically responds in the porous material include one or more selected from the group consisting of quinones, imines, and imides. Specific examples include benzoquinone, anthraquinone, phenanthrenequinone, phenanthroline, pyridine, phenazine, pyrimidine, methylviologen, benzodipyrrole, phthalimide, phthaldiimide, naphthaleneimide, naphthalenediimide, and derivatives of these organic molecules. The chemical formula of the organic molecules is shown below. Examples of derivatives of methyl viologen (also called 1,1'-dimethyl-4,4'-bipyridinium dichloride) include viologens such as 1,1'-dibenzyl-4,4'-bipyridinium dichloride (also called: benzylviologen), 1,1'-diphenyl-4,4'-bipyridinium dichloride, 1,1'-bis(2,4-dinitrophenyl)-4,4'-bipyridinium dichloride, 1,1'-di-n-octyl-4,4'-bipyridinium dibromide, and 1,1'-diheptyl-4,4'-bipyridinium dibromide.

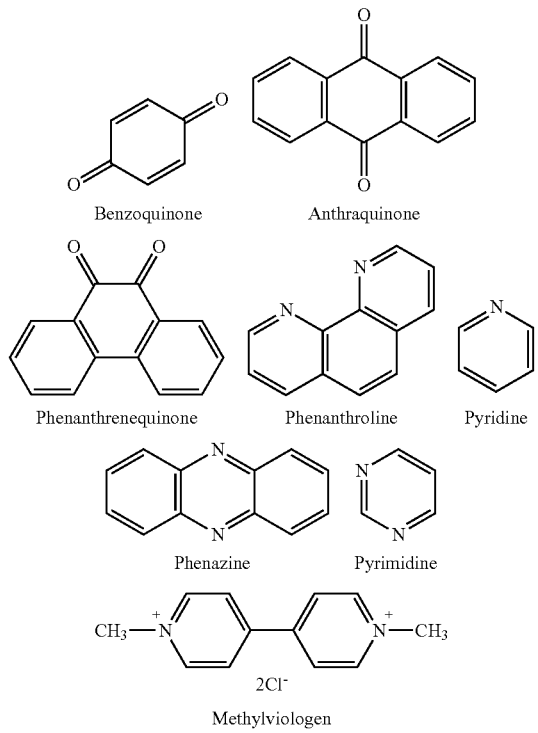

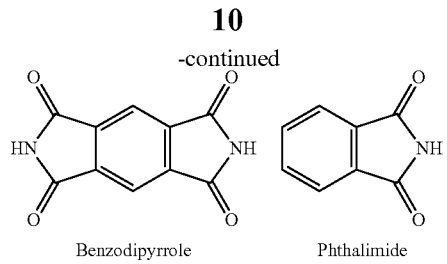

Benzodipyrrole     Phthalimide

A chemical reaction, which is responsible for adsorption and desorption of carbon dioxide ($CO_2$) by oxidation and reduction of moieties included in the porous material due to electrical response, will be described with reference to an electrical response reaction by anthraquinone as an example of redox-active organic molecules. Anthraquinone takes in two electrons at a reduction potential, and when $CO_2$ is present in the environment, anthraquinone forms a chemical bond with $CO_2$ by the following reaction formula to take in $CO_2$.

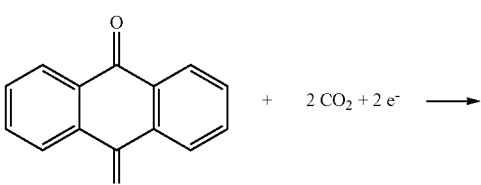

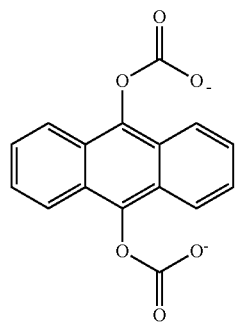

The chemical reaction reversibly proceeds, and when the oxidation potential is reached, $CO_2$ is desorbed by the following reaction formula, so that the structure returns to the original anthraquinone structure.

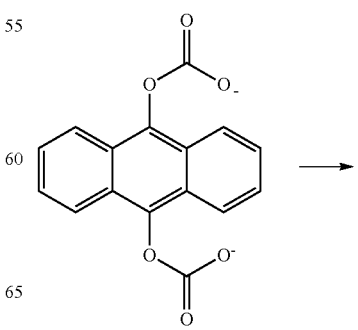

-continued

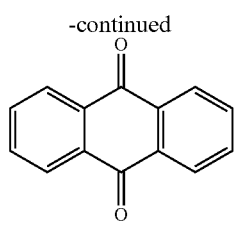 + 2 CO$_2$ + 2 e$^-$

As in the above example, the organic molecules used for the moieties as active reaction points in the porous material are preferably chemically highly stable because the organic molecules are regenerated by releasing CO$_2$ after absorbing CO$_2$ and repeatedly used.

The organic molecules preferably each contain one or more groups selected from the group consisting of an amino group, a carboxyl group, an aldehyde group, a carbonyl group, and a nitrile group at the terminal.

The porous material preferably contains one or more selected from the group consisting of a covalent-organic framework (COF), a metal-organic framework (MOF), a porous carbon material, zeolite, porous silica, porous alumina, and a porous substance obtained by modifying amine molecules into pores of these porous materials. For example, the porous material may include a COF having electrical responsiveness. Alternatively, the porous material may contain an MOF having electrical responsiveness.

The COF contained in the porous material preferably contains one or more bonds selected from the group consisting of an imine bond, a hydrazine bond, an azine bond, an imide bond, a phenazine bond, a triazine bond, or an enamine bond obtained by a condensation reaction between an organic molecule having an amino group and an organic molecule having an aldehyde group or a carbonyl group, or by a cyclization reaction of an organic molecule having a nitrile group.

In the COF, it is desirable that the charge smoothly moves to the redox-active moieties, and thus, it is preferable that two-dimensional structural units of the COF form a three-dimensional structure by Π-Π stacking. By including such a stacked structure with Π-Π stacking in the porous material, the efficiency of electrical response is improved, and the energy reduction is promoted. Examples of the COF that form a three-dimensional structure by Π-Π stacking include TpPa COF, PA-COF, 4KT-Tp COF, 2KT-Tp COF, 1KT-Tp COF, DAAQ-TFP-COF, PI-COF-1, PI-COF-2, PI-COF-3, CS-COF, CTF-1, CTF-2, TAPB-PDA-COF, N$_3$-COF, COF-42, and derivatives thereof. It is preferable to include one or more of these COFs capable of forming a stacked structure by stacking. The chemical structures of the above examples of COF are shown below. Note that the TpPa COF includes COF-TpPa-1, TpPa-(OH)$_2$, and the like. In the TpPa COF structure shown below, R$_1$=H and R2 =H for COF-TpPa-1, and R$_1$=OH and R$_2$=OH for TpPa-(OH)$_2$. The specific surface area of the COFs in the above examples varies depending on the pore structure, and the amount of CO$_2$ that can be theoretically adsorbed per unit weight of the COF varies depending on the number of redox-active points in the organic molecule.

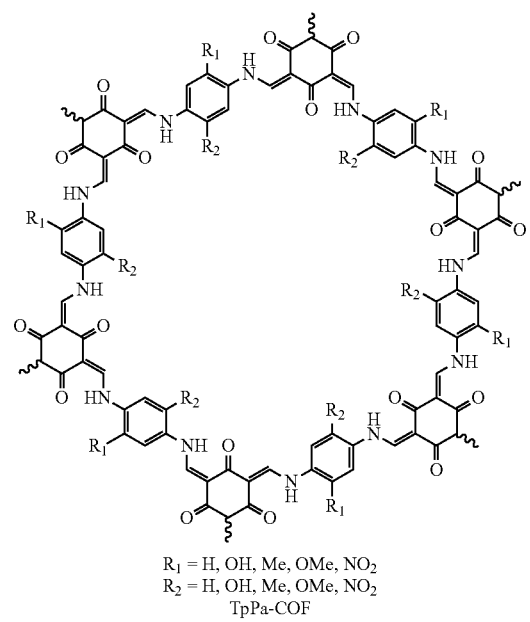

R$_1$ = H, OH, Me, OMe, NO$_2$
R$_2$ = H, OH, Me, OMe, NO$_2$
TpPa-COF

-continued
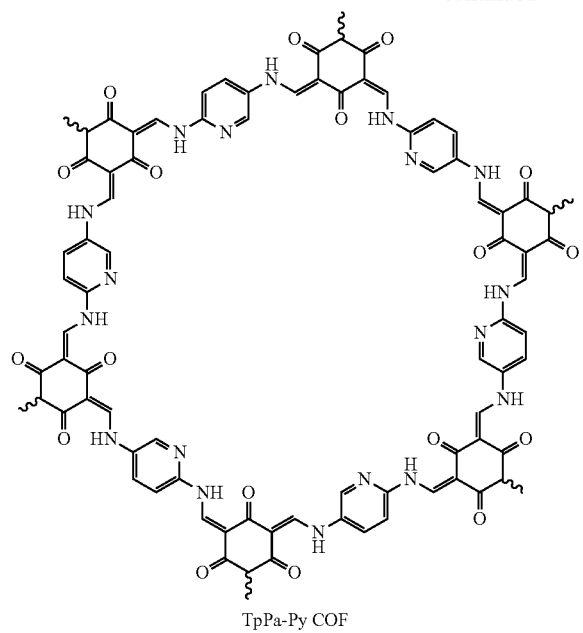
TpPa-Py COF
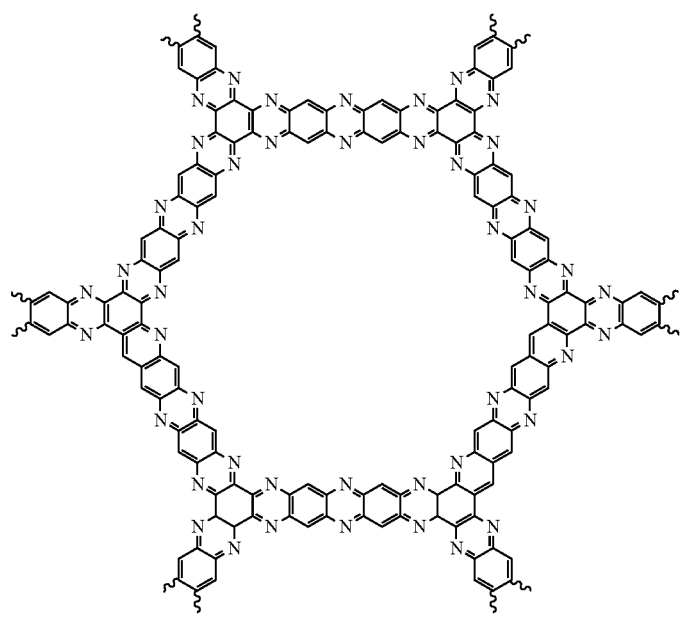
PA-COF

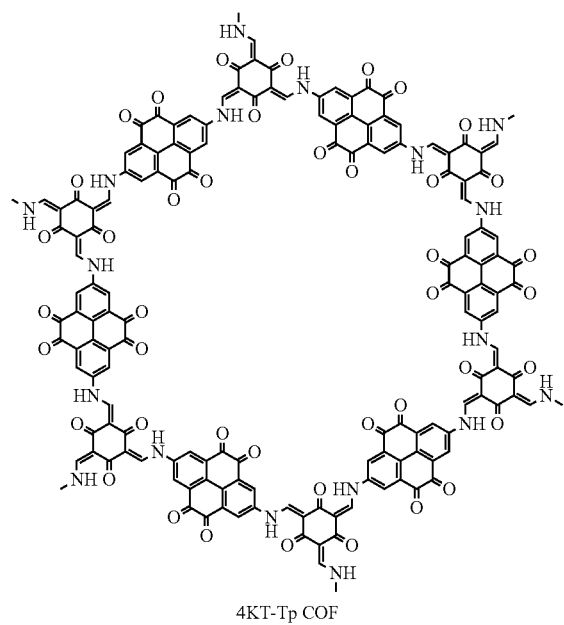
4KT-Tp COF
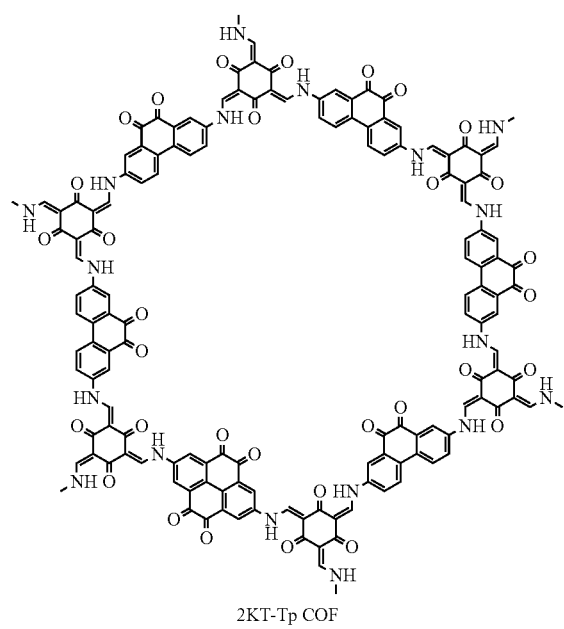
2KT-Tp COF

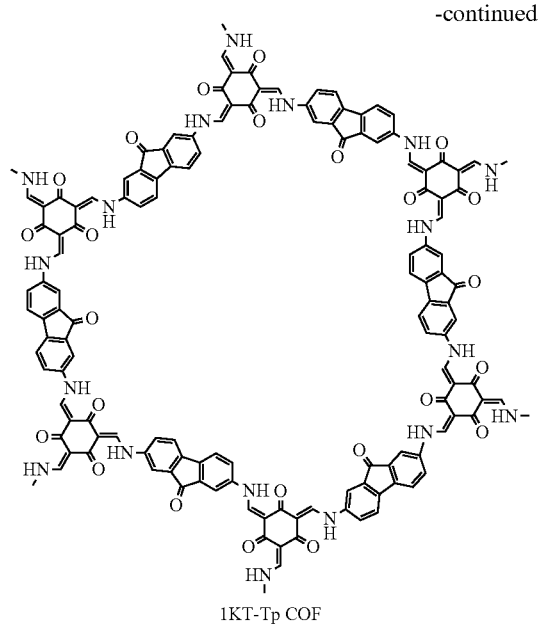
1KT-Tp COF
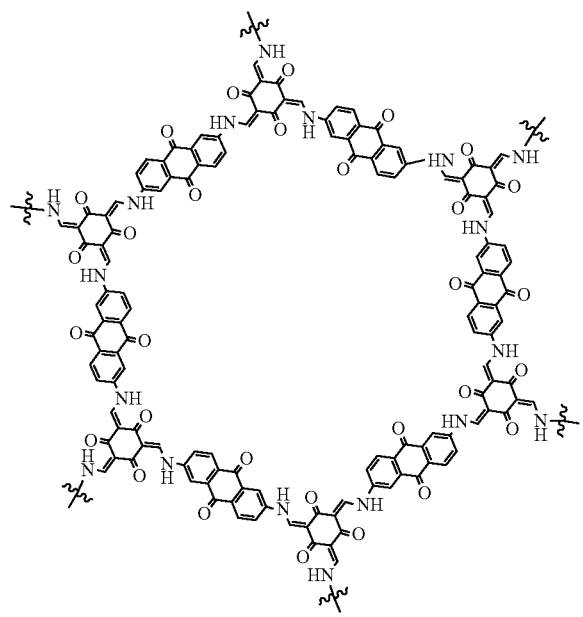
DAAQ-TFP-COF

-continued
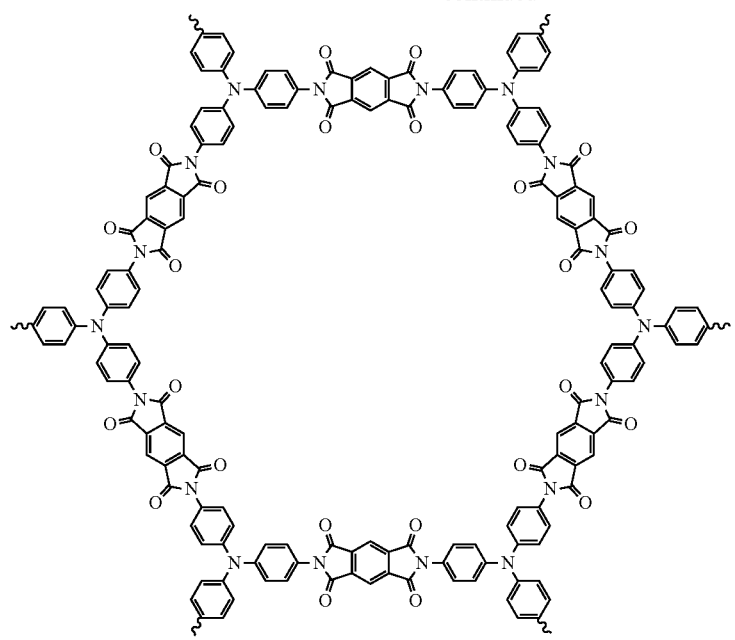
PI-COF-1
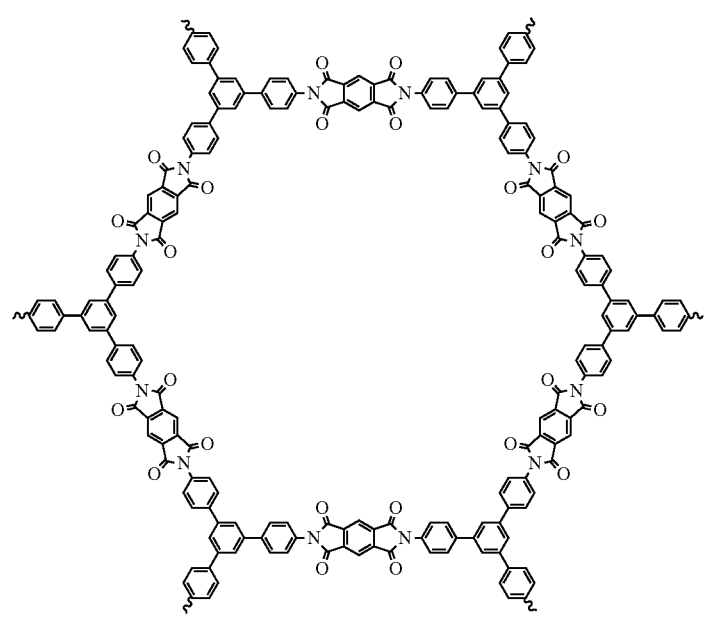
PI-COF-2

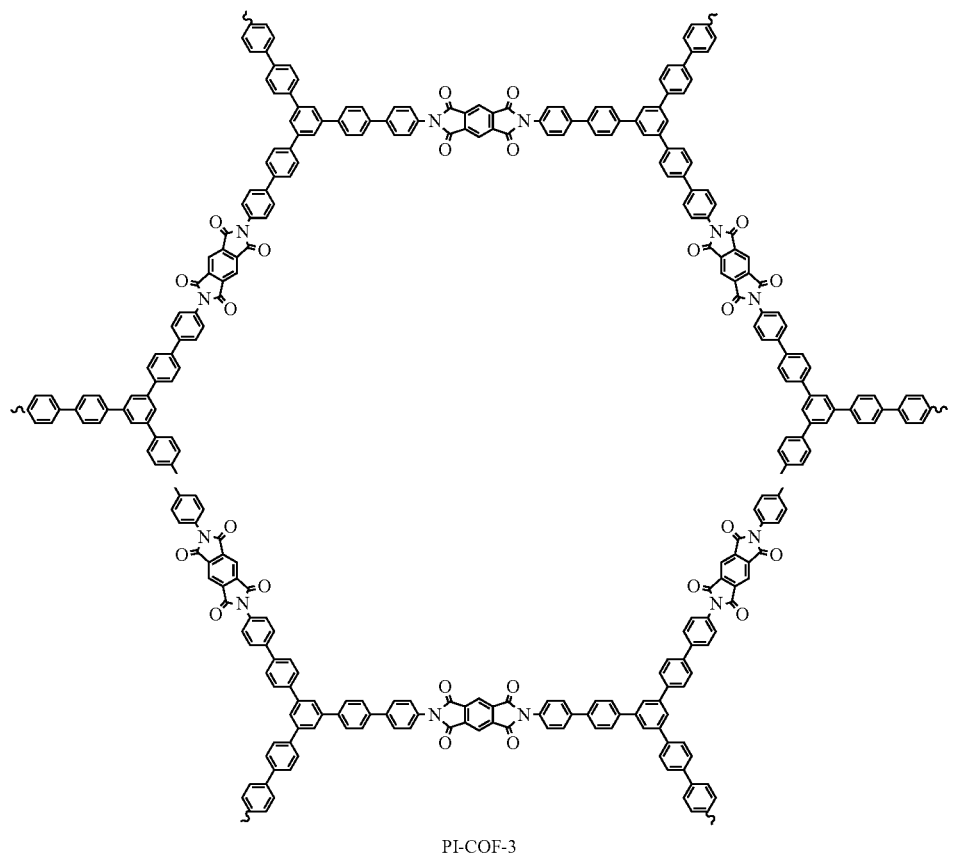
PI-COF-3
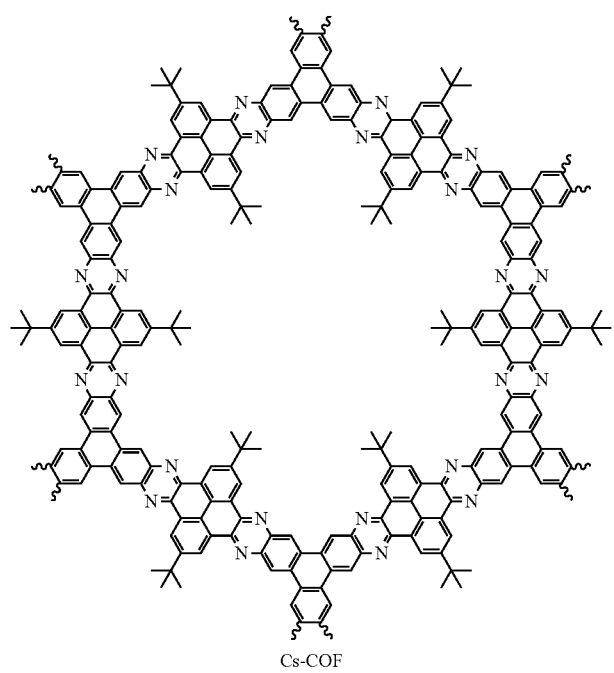
Cs-COF

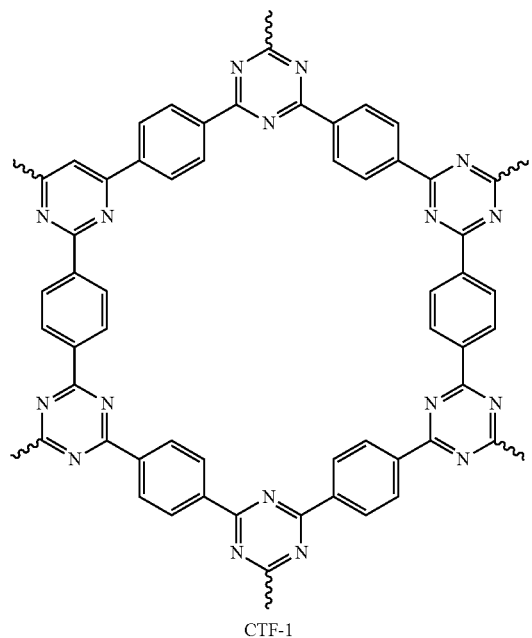
CTF-1
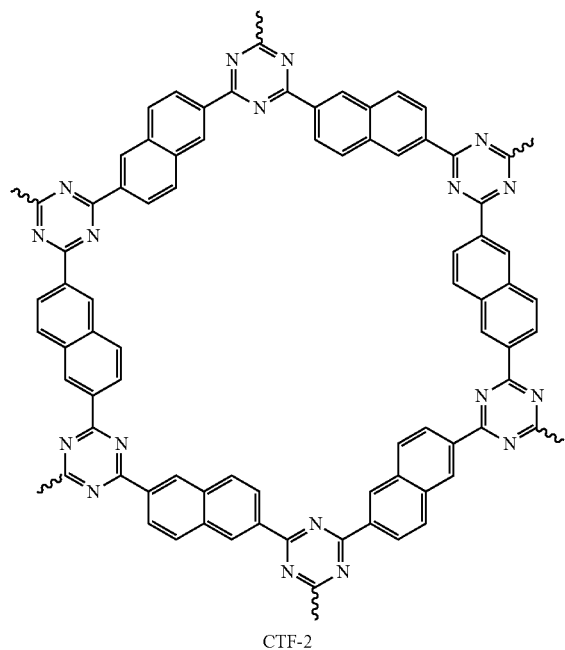
CTF-2
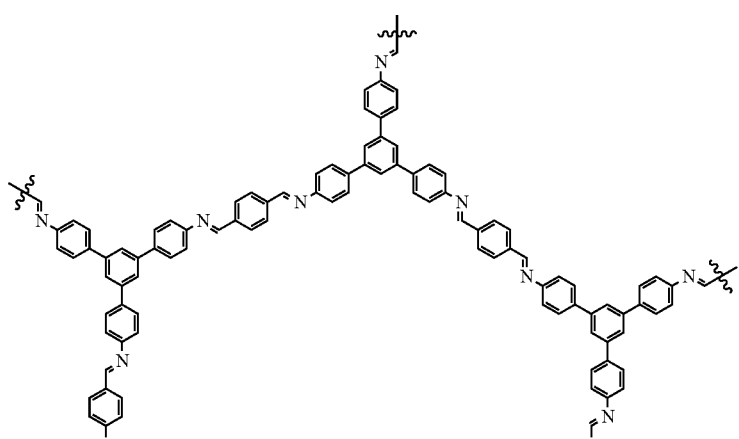

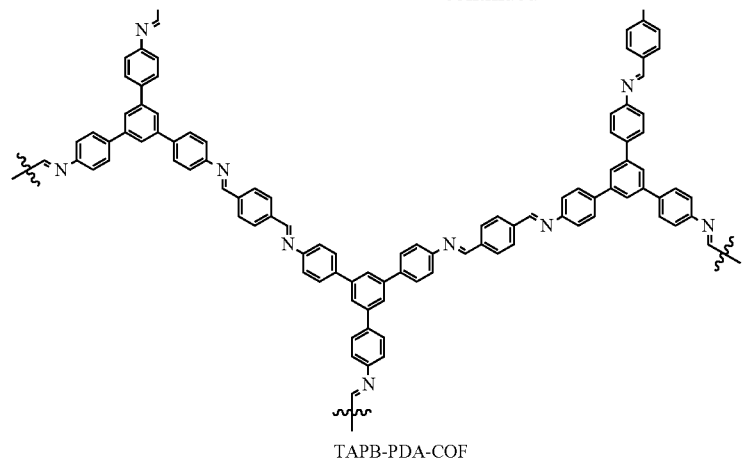
TAPB-PDA-COF
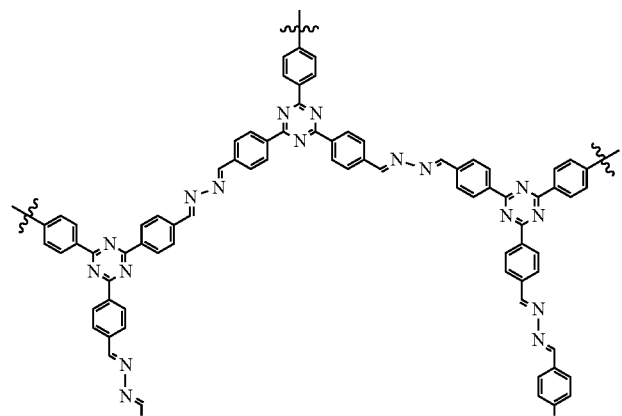
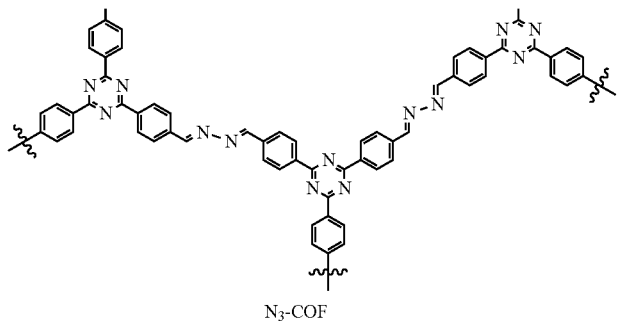
N₃-COF
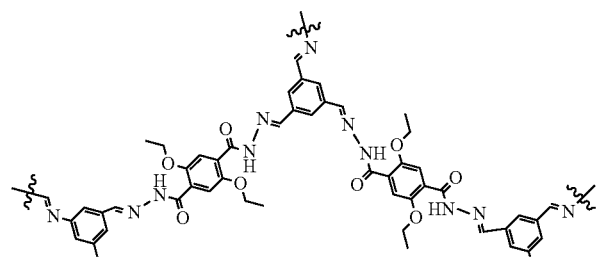

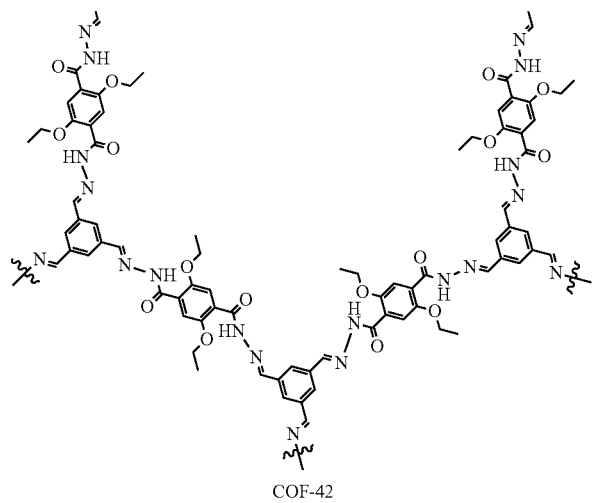
COF-42
Taking a part of the COFs listed above as examples, the imine bond, the azine bond, the enamine bond, the hydrazone bond, or the imide bond included in the COFs are shown below.
(25)
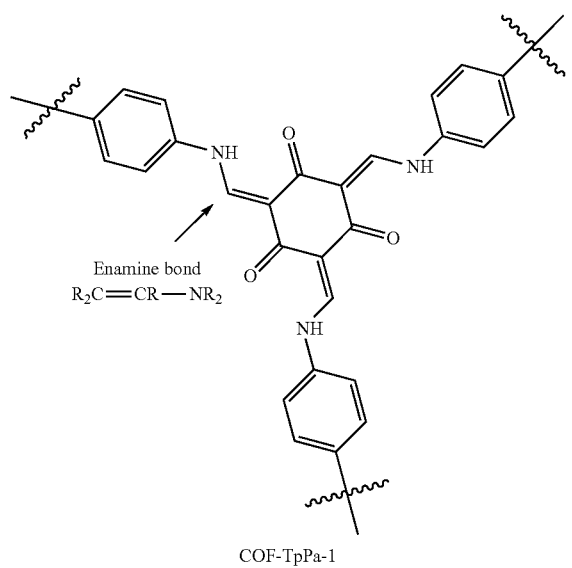
Enamine bond
$R_2C=CR-NR_2$
COF-TpPa-1

-continued
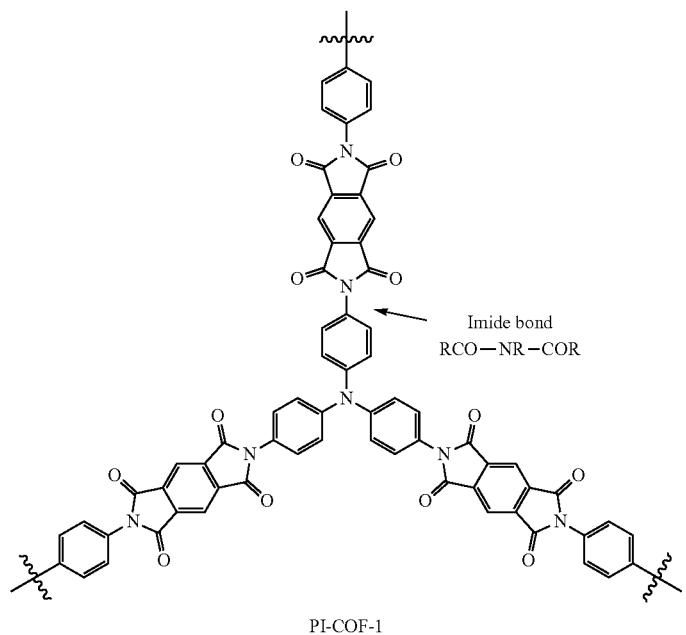
PI-COF-1
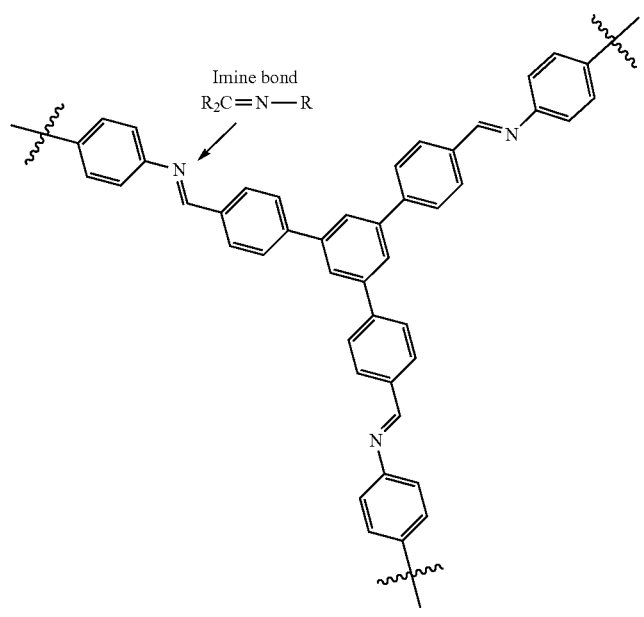
TAPB-PDA-COF

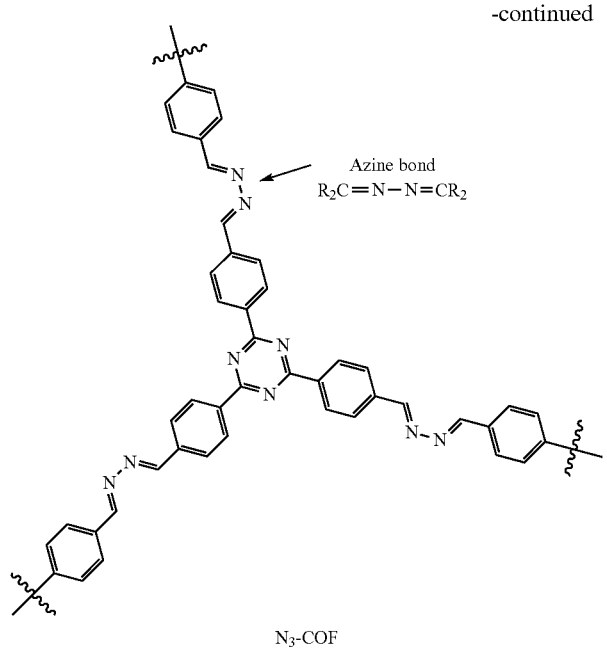

N₃-COF

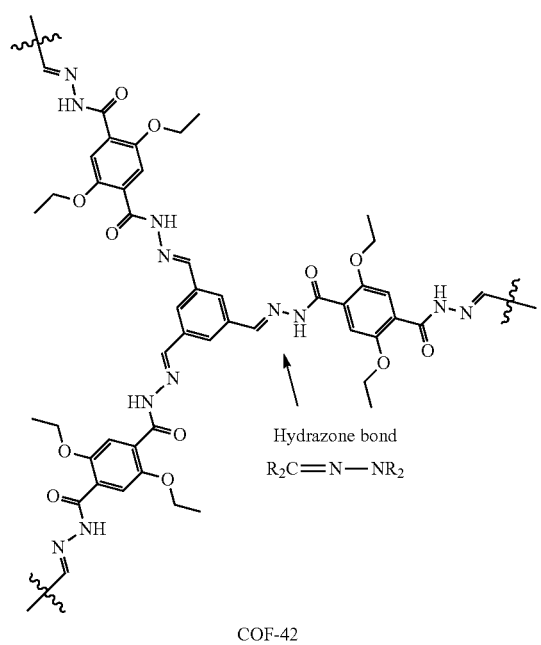

COF-42

On the other hand, the MOF preferably has high water resistance and heat resistance because a three-dimensional structure is established by ionic bonds. In particular, it is preferable to use an MOF having a structure in which 12 dicarboxylic acids are coordinated to a six-node $Zr_6O_4(OH)_4$ cluster. The structure is shown below. In the following structures, o (white circle) represents a $Zr_6O_4(OH)_4$ cluster, and a solid line represents a dicarboxylic acid ligand.

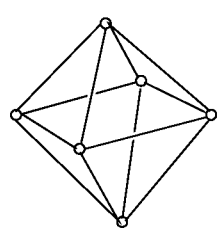

As a preferred example of an MOF having a structure in which 12 dicarboxylic acids are coordinated to the six-node $Zr_6O_4(OH)_4$ cluster, an MOF having a UiO (Universitet i Oslo) structure can be mentioned. For example, it is preferable to use one or more selected from the group consisting of UiO-66, UiO-67, UiO-68, and derivatives thereof. UiO-66, UiO-67, and UiO-68 have a structure in which the dicarboxylic acid ligand is 1,4-benzenedicarboxylic acid, 4,4'-biphenyldicarboxylic acid, or 4,4''-terphenyldicarboxylic acid, respectively. The above-mentioned derivative refers to a derivative obtained by introducing a new functional group into a benzene ring of a ligand included in the above-mentioned derivatives. The functional group includes, for example, an amino group, a hydroxyl group, an alkoxy group, an amide group, an aldehyde group, an acyl group, an ester group, a carbonyl group such as a carboxyl group, and the like. As other examples of the derivative, there are derivatives in which a benzene ring of the ligand is substituted with a heteroaromatic ring such as a pyridine ring or an imidazole ring. Regarding UiO-67, the derivative includes a derivative substituted with a heterocyclic compound such as 9-fluorenone-2,7-dicarboxylic acid, fluorene-2,7-dicarboxylic acid, or carbazole-2,7-dicarboxylic acid, instead of 4,4'-biphenyldicarboxylic acid.

Specific examples of the MOF having a UiO structure include 2,6-Zr-AQ-MOF $(Zr_6O_4(OH)_4(C_{16}O_6H_6)_6(C_3H_7NO_3)_{17}(H_2O)_{22})$ and 1,4-Zr-AQ-MOF $(Zr_6O_4(OH)_4(C_{16}O_6H_6)_4(C_2O_2H_3)_{2.76}(CO_2H)_{1.24}(C_3H_7NO)_{11}(H_2O)_{40})$. In these MOFs, as dicarboxylic acid ligands coordinated to the six-node $Zr_6O_4(OH)_4$ cluster, 2,6-dicarboxy-9,10 anthraquinone and 1,4-dicarboxy-9,10 anthraquinone are coordinated and present on the surfaces of pores. In such a manner, anthraquinone is included as a bridged functional group. The structures of these MOFs are shown below. In the following, a simplified structure is illustrated in which only one anthraquinone is clearly shown and the remaining 11 anthraquinones (solid lines) are omitted.

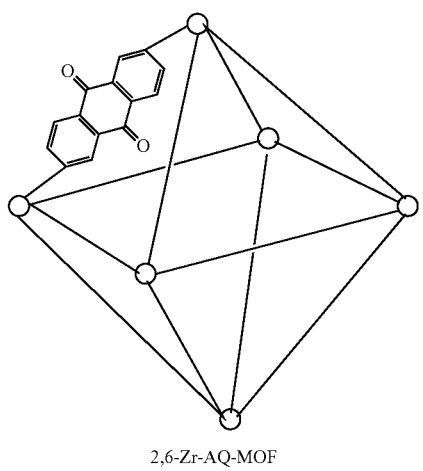

2,6-Zr-AQ-MOF

-continued

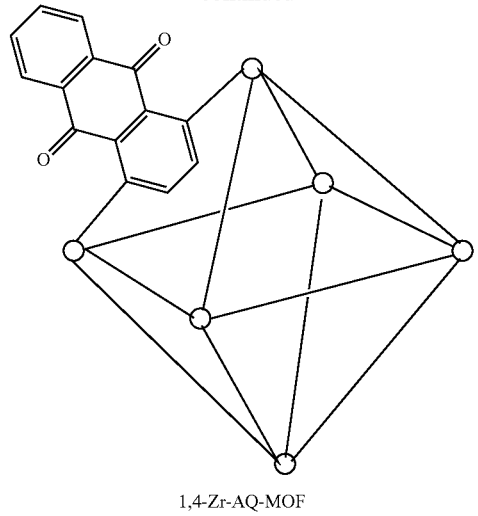

1,4-Zr-AQ-MOF

Other examples of the MOF include MOFs having a Cu(2,7-anthraquinone dicarboxylic acid) structure (Cu(2,7-AQDC) structure), a Mn(2,7-anthraquinone dicarboxylic acid) structure (Mn(2,7-AQDC) structure), or an IRMOF structure. Furthermore, an example is a MOF having a structure analogous to IRMOF-9 in which biphenylene dicarboxylic acid is substituted with anthraquinone dicarboxylic acid.

Cu(2,7-AQDC) has a network structure in which bridged 2,7-AQDC ligands are coordinated to paddle wheel binuclear complex $Cu_2(Ac)_4$ clusters as nodes. A π-π interaction may occur between some 2,7-AQDC ligands, and the structure is reinforced by the π-π interaction. Mn(2,7-AQDC) has a lattice structure in which bridged 2,7-AQDC ligands are coordinated to Mn complex clusters. The specific surface area of the MOF in the above examples varies depending on the pore structure, and the amount of $CO_2$ that can be theoretically adsorbed per unit weight of the MOF varies depending on the number of redox-active points in the organic molecule.

The porous substance used as the porous material is not limited to the above materials. For example, activated carbon, mesoporous silica, or the like may also be used as the porous material. Activated carbon or mesoporous silica may be used alone as is, or a material modified with an electro-active group may be used.

The MOF may include one or more central metals selected from the group consisting of zirconium, copper, and manganese. The central metal may be, for example, the central metal of a metal complex that may be included within the MOF in a cluster. For example, the MOF having the UiO structure described above contains clusters of $Zr_6O_4(OH)_4$ which is a complex containing zirconium as the central metal. Cu(2,7-AQDC) includes clusters of a complex containing copper as the central metal, and Mn(2,7-AQDC) includes clusters of a complex containing manganese as the central metal.

(Electrolyte)

The porous composite may contain an electrolyte. As the electrolyte component, for example, an electrolyte containing one or more selected from the group consisting of an ionic-bonding salt and an ion-conductive polymer may be used. The electrolyte may also be present inside the pores in the porous material.

Specifically, the ionic-bonding salt is preferably one or more selected from the group consisting of an alkali metal salt, an alkaline earth metal salt, a transition metal salt, an amphoteric metal salt, an ammonium salt, an imidazolium salt, a pyridinium salt, and a phosphonium salt. The form of the ionic-bonding salt may be a solid or a liquid, and examples of the liquid include an ionic liquid.

As the cation of the ion-bonding salt, one or more selected from the group consisting of alkali metals such as Li, Na, K, Rb, and Cs; alkaline earth metals such as Mg, Ca, Sr, and Ba; transition metals such as Ti, Cr, Mn, Fe, Co, Ni, Cu, Zn, Zr, Pd, and Ag; amphoteric metals such as Al, Ga, and Sn; ammonium ions and ammonium ions substituted with C1 to C5 lower hydrocarbons ($N(C_nH_{2n+1})_4^+$, n=1 to 5); imidazolium ions or imidazolium ions with 1 to 3 substituents; pyridinium ions or pyridinium ions with 1 to 3 substituents; phosphonium ions $PR_4^+$ (R is hydrocarbon group) with four substituents may be used, and one of the above may be used alone, or plural of the above may be used in combination.

As the anion of the ionic-bonding salt, one or more selected from the group consisting of halogens such as $Cl^-$, $Br^-$, and $I^-$, nitrate ion ($NO_3^-$), $PF_6^-$, $BF_4^-$, $CH_3COO^-$, $CF_3COO^-$, $ClO_4^-$, and $N(SO_2CF_3)_2^-$ may be used, and one of the above may be used alone, or plural of the above may be used in combination.

As the ion-conductive polymer, for example, one or more selected from the group consisting of polyethylene oxide (PEO), polypropyl oxide (PPO), polyacrylonitrile (PAN), polyvinyl chloride (PVC), and an ionic liquid polymer are preferably used.

Of the above ion-conductive polymers, PEO, PPO, PAN, and PVC can also serve as the above-mentioned structure reinforcing component that physically reinforces the porous composite.

<Manufacturing Method>

The carbon dioxide adsorption-desorption device can be manufactured as follows, for example.

First, a porous composite is prepared. The porous composite, the second electro-conductive component, and a binder are added to a solvent. The obtained mixture is kneaded to prepare a paste. This paste is applied onto, for example, the current collector. For example, if a flat plate-shaped current collector is used, the paste is applied onto one side or both sides thereof. Then, the applied paste is heated and dried to obtain an electrode including the current collector and the porous composite.

The above is merely an example, and the paste need not necessarily contain a binder. Depending on the properties of the electro-conductive component, the paste may be made into a free-standing electrode by heating and drying. Namely, an electrode including the porous composite alone may be obtained, for example, without using the current collector.

The porous composite is synthesized, for example, by adding the first electro-conductive component to a raw material liquid containing a raw material used for synthesis of a solitary porous material. The raw material for the porous material includes organic molecules exhibiting redox activity with electrical response.

The porous substance used for the porous material preferably has a structure that does not become altered even when combined with the electro-conductive component. This is because, when the structure of the porous material changes, the specific surface area decreases or the pores diminish, making the effective active groups reduced, whereby the carbon dioxide adsorption/desorption ability becomes degraded.

When an electrolyte is to be included in the device, for example, an electrolyte solution is prepared, the prepared solution is cast on the electrode surface, and then vacuum impregnation is performed, whereby the electrolyte can be included in the electrode.

The carbon dioxide adsorption-desorption device described above includes the electrode with the porous composite. The porous composite includes the electro-conductive component and the porous material thereon. The porous material contains moieties exhibiting redox activity due to electrical response in angstrom or nanometer size pores. Such a device is an electrically responsive carbon dioxide adsorption-desorption device capable of efficiently absorbing and releasing carbon dioxide with low energy.

[Carbon Dioxide Separation Method]

The carbon dioxide adsorption-desorption device according to the above embodiment has the porous composite having the porous material containing the redox-active moieties on the electro-conductive component. Thus, the device is able to adsorb carbon dioxide at a reduction potential and desorb carbon dioxide at an oxidation potential, thereby being capable of efficiently recovering and concentrating carbon dioxide.

A carbon dioxide separation method according to an embodiment includes, by using the carbon dioxide adsorption-desorption device, removing carbon dioxide from a gas containing the carbon dioxide by adsorbing the carbon dioxide onto a porous material, and regenerating the porous material by desorbing the carbon dioxide from the porous material. Adsorbing the carbon dioxide onto the porous material includes causing an electrical current to flow through the porous material at the reduction potential of the porous material, and bringing the gas containing the carbon dioxide into contact with the porous material in a state where a potential flowing through the porous material is maintained at the reduction potential. Regenerating the porous material by desorbing the carbon dioxide from the porous material includes switching the potential flowing through the porous material that had adsorbed carbon dioxide to the oxidation potential of the porous material. The regenerated porous material can be reused.

By setting the device again to the reduction potential after the separation of the carbon dioxide from the porous material, the device becomes capable of adsorbing carbon dioxide again. In this way, the device can be repeatedly used numerous times by performing switching of the potential of electrical current flowing through the porous material between the reduction potential and the oxidation potential.

A method for bringing the gas containing carbon dioxide into contact with the carbon dioxide adsorption-desorption device is not particularly limited. For example, there is a method by which the carbon dioxide adsorption-desorption device is immersed in an electrolytic solution, bubbling of a gas containing carbon dioxide in the electrolytic solution is performed, to thereby cause the carbon dioxide to become adsorbed onto the device within the electrolytic solution. As another example, there is a method by which the carbon dioxide adsorption-desorption device is placed in a gas flow containing carbon dioxide.

The concentration of the carbon dioxide to be brought into contact with the device is not particularly limited, but may correspond to a wide range of $CO_2$ concentrations from an atmospheric level to a level of exhausts from a thermal power plant or the like. Specifically, the concentration of the carbon dioxide is preferably 0.01 vol % or more to 50 vol % or less, and more preferably 0.04 vol % or more to 50 vol % or less.

The environmental temperature at the time of the carbon dioxide absorption and releasing treatment is usually preferably 10° C. or more to 60° C. or less. The temperature is more preferably 50° C. or lower, and particularly preferably 20° C. or more to 45° C. or less. The adsorption amount of carbon dioxide increases at a lower temperature. The lower limit value of the treatment temperature can be determined by the processing gas temperature, the heat recovery target, and the like. The adsorption pressure of carbon dioxide is usually approximately equal to the atmospheric pressure. Higher pressure may also be applied in order to increase absorption performance. However, from the viewpoint of suppressing energy consumption required for compression, it is preferable to perform the treatment under atmospheric pressure.

The method for absorbing and releasing carbon dioxide using the carbon dioxide adsorption-desorption device may include, for example, the following:

applying electrical current to the porous composite at the reduction potential;

causing the carbon dioxide to come into contact with and be adsorbed onto the redox-active moiety;

flowing electrical current with the potential changed to the oxidation potential; and desorbing the carbon dioxide from the redox-active moiety.

The carbon dioxide separation method described above includes causing carbon dioxide to be adsorbed onto the porous material included in the carbon dioxide adsorption-desorption device causing the porous material to desorb and separate the carbon dioxide from the porous material having adsorbed the carbon dioxide, and regenerating the porous material. The carbon dioxide is caused to be adsorbed onto the porous material in a state where the electrical current flowing through the porous material is maintained at the reduction potential. When the electrical current flowing through the porous material is switched to the oxidation potential, and then, in a state where the oxidation potential maintained, the carbon dioxide is desorbed. According to this separation method, carbon dioxide can be efficiently absorbed and released with low energy.

EXAMPLES

Hereinafter, examples of the carbon dioxide adsorption-desorption device will be described.

Example 1

<Synthesis of TpPA-$(OH)_2$—CNT Composite>

A porous composite was prepared by modifying a carbon nanotube (CNT) as an electro-conductive component with TpPa-$(OH)_2$ as a porous material. TpPa-$(OH)_2$ is a COF including benzoquinone (BQ) as redox-active moieties. As a reactant for obtaining the COF, 2,5-diaminohydroquinone dihydrochloride (Pa$(OH)_2$.2HCl) was prepared with reference to Non-Patent Document "Chem. Mater. 2017, 29, 5, 2074-2080" written by Suman Chandra, et al. CNT was added to a raw material solution containing Pa$(OH)_2$.2HCl such that BQ:CNT=5:6 (weight ratio), thereby synthesizing a TpPA-$(OH)_2$-CNT composite. The product was washed by extraction with methanol at 105° C. for 12 hours using a Soxhlet extractor, and then dried under reduced pressure at 120° C. for 2 hours.

<Film Formation on Current Collector>

TpPA-$(OH)_2$—CNT composite obtained as described above, Ketjen black, and PVdF were added to N-methylpyrrolidone (NMP) such that TpPA-$(OH)_2$—CNT composite: Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 1.

Example 2

<Synthesis of DAAQ-TFP-COF-CNT Composite>

A porous composite was prepared by modifying a CNT as an electro-conductive component with DAAQ-TFP-COF as a porous material. DAAQ-TFP-COF is a COF including anthraquinone (AQ) as redox-active moieties. As a reactant for obtaining the COF, 2,6-anthraquinone diamine (DAAQ) was prepared with reference to Non-Patent Document "Carbon 171 (2021) 248-256" written by Xueying Kong, et al. The CNT was added to a raw material solution containing DAAQ such that DAAQ:CNT=5:6 (weight ratio) to synthesize a DAAQ-TFP-COF-CNT composite. The product was washed by extraction with methanol at 105° C. for 12 hours using a Soxhlet extractor, and then dried under reduced pressure at 120° C. for 2 hours.

<Film Formation on Current Collector>

DAAQ-TFP-COF-CNT composite (hereinafter referred to as AQ-COF CNT) obtained above, a carbon material, and PVdF were added to NMP such that AQ-COFCNT:carbon material:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 2.

Example 3

<Synthesis of 1KT-Tp COF-CNT Composite>

A porous composite was prepared by modifying a CNT as an electro-conductive component with 1KT-Tp COF as a porous material. 1KT-Tp COF is a COF including fluorene as redox-active moieties. As a reactant for obtaining the COF, 2,7-diamino-9H-fluoren-9-one (1KT-BD) was prepared with reference to Non-Patent Document "CCS Chem. 2020, 2, 696-706" written by Miao Li, et al. The CNT was added to a raw material solution containing 1KT-BD such that 1KT-BD:CNT=5:6 (weight ratio), thereby synthesizing a 1KT-Tp COF-CNT composite. The product was washed by extraction with methanol at 105° C. for 12 hours using a Soxhlet extractor, and then dried under reduced pressure at 120° C. for 2 hours.

<Film Formation on Current Collector>

1KT-Tp COF-CNT composite obtained as described above, Ketjen black, and PVdF were added to NMP such that 1KT-Tp COF-CNT composite:Ketjen black:PVdF=8: 1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 3.

Example 4

<Synthesis of 2KT-Tp COF-CNT Composite>

A porous composite was prepared by modifying a CNT as an electro-conductive component with 2KT-Tp COF. 2KT-Tp COF is a COF including phenanthrene as redox-active moieties. 2KT-Tp COF-CNT composite was synthesized by adding the CNT to a raw material solution containing 2,7-diaminophenanthrene-9,10 dione (2KT-BD) such that 2KT-BD:CNTs=5:6 (weight ratio) with reference to Non-Patent Document "CCS Chem. 2020, 2, 696-706" written by Miao Li, et al. The product was washed by extraction with methanol at 105° C. for 12 hours using a Soxhlet extractor, and then dried under reduced pressure at 120° C. for 2 hours.

<Film Formation on Current Collector>

2KT-Tp COF-CNT composite obtained as described above, Ketjen black, and PVdF were added to NMP such that 2KT-Tp COF-CNT:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 4.

Example 5

(Synthesis of 4KT-Tp COF-CNT Composite)

A porous composite was prepared by modifying CNT as an electro-conductive component with 4KT-Tp COF. 4KT-Tp COF is a COF including phenanthrene as redox-active moieties. 4KT-Tp COF-CNT composite was synthesized by adding the CNT to a raw material solution containing 2,7-diaminopyrene-4,5,9,10-tetraone(4KT-BD) such that 4KT-BD:CNTs=5:6 (weight ratio) with reference to Non-Patent Document "CCS Chem. 2020, 2, 696-706" written by Miao Li, et al. The product was washed by extraction with methanol at 105° C. for 12 hours using a Soxhlet extractor, and then dried under reduced pressure at 120° C. for 2 hours.

<Film Formation on Current Collector>

4KT-Tp COF-CNT composite obtained as described above, Ketjen black, and PVdF were added to NMP such that 4KT-Tp COF-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 5.

Example 6

<Synthesis of TpPa-Py COF-CNT Composite>

A porous composite was prepared by modifying a CNT as an electro-conductive component with TpPa-Py COF. TpPa-Py COF is a COF including pyridine as redox-active moieties. A TpPa-Py COF-CNT composite was synthesized by adding the CNT to a raw material solution containing 2,6-diaminopyridine (TpPa-Py) such that TpPa-Py:CNT=5:6 (weight ratio) with reference to Non-Patent Document "Mater. Chem. Front., 2017, 1, 1310-1316" written by Qui Sun, et al. The product was washed by extraction with methanol at 105° C. for 12 hours using a Soxhlet extractor, and then dried under reduced pressure at 120° C. for 2 hours.

<Film Formation on Current Collector>

TpPa-Py COF-CNT composite obtained as described above, Ketjen black, and PVdF were added to NMP such that TpPa-Py COF-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 6.

Example 7

<Synthesis of DAPH-TFP COF-CNT Composite>

A porous composite was prepared by modifying a CNT as an electro-conductive component with DAPH-TFP COF. DAPH-TFP COF is a COF including pyridine as redox-active moieties. A DAPH-TFP COF-CNT composite was synthesized by adding the CNT to a raw material solution containing 2,7-diamino-phenazine (DAPH.Bnzph) such that DAPH.Bnzph:CNT=5:6 (weight ratio) with reference to Non-Patent Document "J. Am. Chem. Soc. 2020, 142, 1, 16-20" written by Edon Vitaku, et al. The product was washed by extraction with methanol at 105° C. for 12 hours using a Soxhlet extractor, and then dried under reduced pressure at 120° C. for 2 hours.

<Film Formation on Current Collector>

DAPH-TFP COF-CNT composite obtained as described above, Ketjen black, and PVdF were added to NMP such that DAPH-TFP COF-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 7.

Example 8

<Synthesis of PI-COF-1-CNT Composite>

A porous composite was prepared by modifying a CNT as an electro-conductive component with PI-COF-1. PI-COF-1 is a COF including pyridine as redox-active moieties. A PI-COF-1 CNT composite was synthesized by adding the CNT to a raw material solution containing pyromellitic dianhydride(PMDA) and tris(4-aminophenyl)amine(TAPA) such that PMDA:CNT=5:6 (weight ratio) with reference to Non-Patent Document "Nat Commun 5, 4503 (2014)" written by Qianrong Fang, et al. The product was washed by extraction with methanol at 105° C. for 12 hours using a Soxhlet extractor, and then dried under reduced pressure at 120° C. for 2 hours.

<Film Formation on Current Collector>

PI-COF-1-CNT composite obtained as described above, Ketjen black, and PVdF were added to NMP such that PI-COF-1-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 8.

Example 9

<Synthesis of PI-COF-2-CNT Composite>

A porous composite was prepared by modifying a CNT as an electro-conductive component with PI-COF-2. PI-COF-2 is a COF including pyridine as redox-active moieties. A PI-COF-2-CNT composite was synthesized by adding the CNT to a raw material solution containing PMDA and 1,3,5-tris(4-aminophenyl)benzene (TAPB) such that PMDA:CNT=5:6 (weight ratio) with reference to Non-Patent Document "Nat Commun 5:4503 (2014)" written by Qianrong Fang, et al. The product was washed by extraction with methanol at 105° C. for 12 hours using a Soxhlet extractor, and then dried under reduced pressure at 120° C. for 2 hours.

<Film Formation on Current Collector>

PI-COF-2-CNT composite obtained as described above, Ketjen black, and PVdF were added to NMP such that PI-COF-2-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 9.

Example 10

<Synthesis of PI-COF-3-CNT Composite>

A porous composite was prepared by modifying a CNT as an electro-conductive component with PI-COF-3. PI-COF-3 is a COF including pyridine as redox-active moieties. A PT-COF-3-CNT composite was synthesized by adding the CNT to a raw material solution containing PMDA and 1,3,5-tris[4-amino(1,1-biphenyl-4-yl)]benzene (TABPB) such that PMDA:CNT=5:6 (weight ratio) with reference to Non-Patent Document "Nat Commun 5:4503 (2014)" written by Qianrong Fang, et al. The product was washed by extraction with methanol at 105° C. for 12 hours using a Soxhlet extractor, and then dried under reduced pressure at 120° C. for 2 hours.

<Film Formation on Current Collector>

PI-COF-3-CNT composite obtained as described above, Ketjen black, and PVdF were added to NMP such that PI-COF-3-CNT composite:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 10.

Example 11

<Addition of Ionic-Bonding Salt>

1-butyl-3-methylimidazolium bis(trifluoromethylsulfonyl) imide (BMIM-Tf$_2$N) was mixed with acetonitrile(60 wt %). 20 µL of the prepared solution was cast on a device prepared in the same manner as the device of Example 2, and then vacuum impregnation was performed to obtain a device of Example 11.

Example 12

<Synthesis of AQ-UiO-CNT Composite>

A porous composite was prepared by modifying a CNT as an electro-conductive component with AQ-UiO. AQ-UiO is a MOF including anthraquinone (AQ) as redox-active moieties. An AQ-UiO-CNT composite (hereinafter referred to as AQ-MOF CNT) was synthesized by adding the CNT to a raw material solution containing 2,6-anthraquinone dicarboxylic acid so as to be 8:1 (weight ratio) to AQ-UiO with reference to Non-Patent Document "Inorg. Chem. 2017, 56, 13741-13747" written by Paul J. Celis-Salazar, et al. The product was subjected to suction filtration with dimethylformamide (DMF), washed with DMF, and dried under reduced pressure at 120° C. for 2 hours.

<Film Formation on Current Collector>

AQ-MOF_CNT obtained as described above, Ketjen black, and PVdF were added to NMP so that AQ-MOF_CNT: Ketjen black:PVdF=7:2:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 12.

Example 13

<Addition of Ionic-Bonding Salt>

1-butyl-3-methylimidazolium bis(trifluoromethylsulfonyl) imide (BMIM-Tf$_2$N) was mixed with acetonitrile(60 wt %). 20 µL of the prepared solution was cast on a device prepared in the same manner as the device of Example 12, and then vacuum impregnation was performed to obtain a device of Example 13.

Example 14

<Synthesis of Cu(2,7-AQDC)-CNT Composite>

A porous composite was prepared by modifying a CNT as an electro-conductive component with Cu(2,7-AQDC). Cu(2,7-AQDC) is an MOF including anthraquinone (AQ) as redox-active organic molecules. A Cu(2,7-AQDC)-CNT composite was synthesized by adding the CNT to a raw material solution containing 2,7-anthraquinone dicarboxylic acid so as to be 8:1 (weight ratio) with respect to Cu(2,7-AQDC) with reference to Non-Patent Document "J. Am. Chem. Soc. 2014, 136, 16112-16115" written by Zhongyue Zhang, et al. The product was subjected to suction filtration with DMF, washed with DMF, and dried under reduced pressure at 120° C. for 2 hours.

<Film Formation on Current Collector>

Cu(2,7-AQDC)-CNT composite obtained as described above, Ketjen black, and PVdF were added to NMP such that Cu(2,7-AQDC)-CNT composite:Ketjen black:PVdF=7:2:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 14.

Example 15

<Synthesis of Mn(2,7-AQDC)-CNT Composite>

A porous composite was prepared by modifying a CNT as an electro-conductive component with Mn(2,7-AQDC). Mn(2,7-AQDC) is an MOF including anthraquinone (AQ) as redox-active organic molecules. A Mn(2,7-AQDC)-CNT composite was synthesized by adding the CNT to a raw material solution containing 2,7-anthraquinone dicarboxylic acid so as to be 8:1 (weight ratio) with respect to Mn(2,7-AQDC) with reference to Non-Patent Document "Chem. Mater. 2016, 28, 5, 1298-1303" written by Zhongyue Zhang, et al. The product was subjected to suction filtration with DMF, washed with DMF, and dried under reduced pressure at 120° C. for 2 hours.

<Film Formation on Current Collector>

Mn(2,7-AQDC)-CNT composite obtained as described above, Ketjen black, and PVdF were added to NMP such that Mn(2,7-AQDC)-CNT composite:Ketjen black: PVdF=7:2:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Example 15.

Example 16

<Preparation of DAAQ-TFP-COF-CNT-CNF Composite Electrode>

A free-standing electrode made of a porous composite was prepared as follows, substituting a part of the CNT in the device of Example 2 with carbon nanofiber (CNF) and omitting the current collector. CNT was added to a raw material solution containing DAAQ such that DAAQ: CNT=8:1 (weight ratio) to synthesize a DAAQ-TFP-COF-CNT composite (AQ-COF CNT). The product was washed by extraction with methanol at 105° C. for 12 hours using a Soxhlet extractor, and then dried under reduced pressure at 120° C. for 2 hours.

AQ-COF CNT obtained above and CNF were added to a solvent such that AQ-COF:CNT:CNF=8:1:1 (weight ratio). The resulting dispersion solution was applied onto a slide glass by a doctor blade method, and a heating treatment was performed at 120° C. for 20 hours. A film peeled off from the slide glass through washing was dried under reduced pressure for one hour to obtain a device of Example 16.

Comparative Example 1

<Preparation of DAAQ-TFP-COF (COF)+Non-fibrous Carbon Material Device>

DAAQ-TFP-COF was obtained by synthesis under the same composition and synthesis conditions as in Example 2 except that CNT was omitted. The obtained DAAQ-TFP-COF, Ketjen black, and PVdF were added to NMP so that COF:Ketjen black:PVdF=8:1:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Comparative Example 1.

Comparative Example 2

<Preparation of AQ-UiO+Non-Fibrous Carbon Material Device>

AQ-UiO was obtained by synthesis under the same composition and synthesis conditions as in Example 12 except that CNT was omitted. The obtained AQ-UiO, Ketjen Black, and PVdF were added to NMP so that AQ-UiO:Ketjen Black:PVdF=7:2:1 (weight ratio). The resulting mixture was kneaded until a proper paste form was obtained. The formed paste was applied onto a current collector. A graphite sheet was used as the current collector. The paste was air-dried overnight and then dried under reduced pressure at 110° C. for two hours to obtain a device of Comparative Example 2.

(Characterization)

<XRD Measurement>

X-ray diffraction (XRD) measurement was performed on COF-CNT and MOF-CNT produced in Example 2 and Example 12. The measurement results are shown in FIGS. 4 and 5.

The XRD measurement was performed as follows. The measurement was performed using an XRD measurement apparatus (Ultima IV manufactured by Rigaku Corporation) in a measurement range of 3° to 40°, a step width of 0.02°, and a scan speed of 4°/min.

FIG. 4 is XRD spectrum showing porous composite AQ-COF CNT produced in Example 2. Two peaks labeled 100 and 110 on the left side of the graph are assigned to a (100) plane and a (110) plane of the DAAQ-TFP-COF, respectively. A broad peak labeled 310 on the right is assigned to the CNT. The peaks labeled 100 and 110 of the COF are located at substantially the same position as the peaks in the spectrum of the DAAQ-TFP-COF alone and not a composite with the CNT. From this, it is understood that the structure of the COF is not altered even when the COF is made into a composite with the CNT.

FIG. 5 shows XRD spectra of the porous composite AQ-MOF_CNT prepared in Example 12 and AQ-MOF and CNT as raw materials thereof. A curve labeled 300 (solid line) shown at the top represents the XRD spectrum of the porous composite AQ-MOF_CNT. The curve labeled 302 (dashed line) shown in the middle represents the XRD spectrum of the AQ-MOF as an isolated MOF. A curve labeled 301 (dotted line) shown at the bottom represents the XRD spectrum of the CNT alone. Since the peak positions in the curve labeled 300 representing the porous composite AQ-MOF_CNT coincides with the sum of the peak positions in the curve labeled 302 representing the AQ-MOF alone and the curve labeled 301 representing the CNT alone, it can be seen that the structure of the MOF is not altered even when the MOF is made into a composite with the CNT.

<Thermogravimetric Analysis>

Thermogravimetric analysis was performed for AQ-COF CNT and AQ-MOF_CNT. A TG measurement apparatus (TG/DTA 6300, EXSTAR 6000 manufactured by Seiko Instruments Inc.) was used. As TG measurement conditions, an alumina open pan for high temperatures was filled with about 3 mg to 5 mg of a sample, and thermogravimetric measurement was performed at a temperature of 30° C. to 700° C. and at a temperature rising rate of 10° C./min while a G2-grade argon gas was flowed at 100 ccm.

Figure 6:
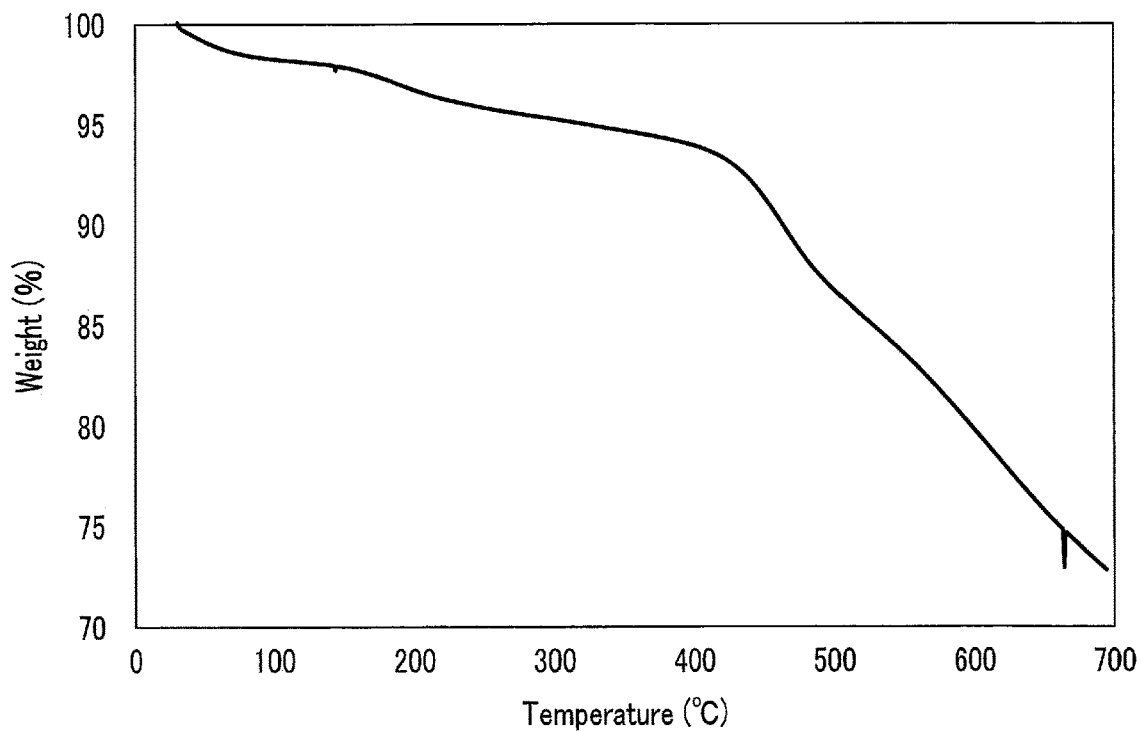
FIG. 6 is a graph showing thermogravimetric analysis of the porous composite produced in Example 2.
Figure 7:
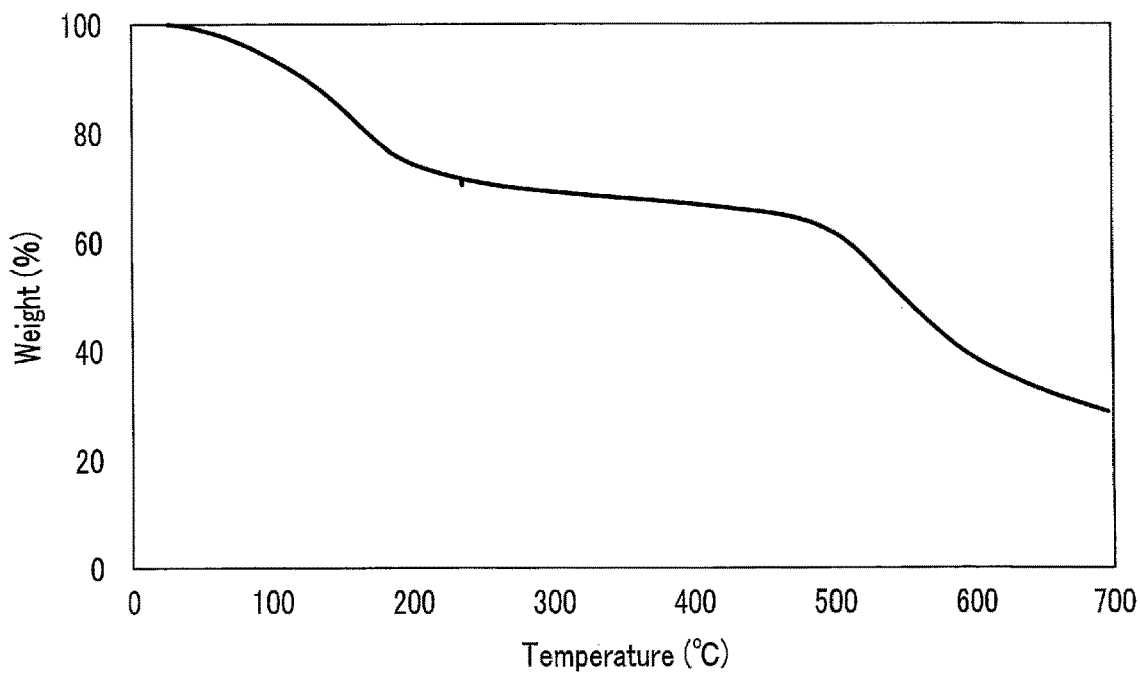
FIG. 7 is a graph showing thermogravimetric analysis of a porous composite produced in Example 12.

FIGS. 6 and 7 show graphs representing thermogravimetric analysis results for the AQ-COF_CNT (porous composite of Example 2) and AQ-MOF_CNT (porous composite of Example 12), respectively. From each figure, weight loss can be confirmed at 300° C. or higher, and thus it can be seen that COF and MOF are present.

<STEM Analysis>

The AQ-COF CNT and AQ-MOF_CNT produced in Example 2 and Example 12 were observed with a scanning transmission electron microscope (STEM). For the STEM, used was an atomic resolution electron microscope (ARM200F manufactured by JEOL Ltd.). A sample was prepared by scooping the sample onto a microgrid by a wet dispersion method using ethanol. The acceleration voltage was 200 kV.

Figure 8:
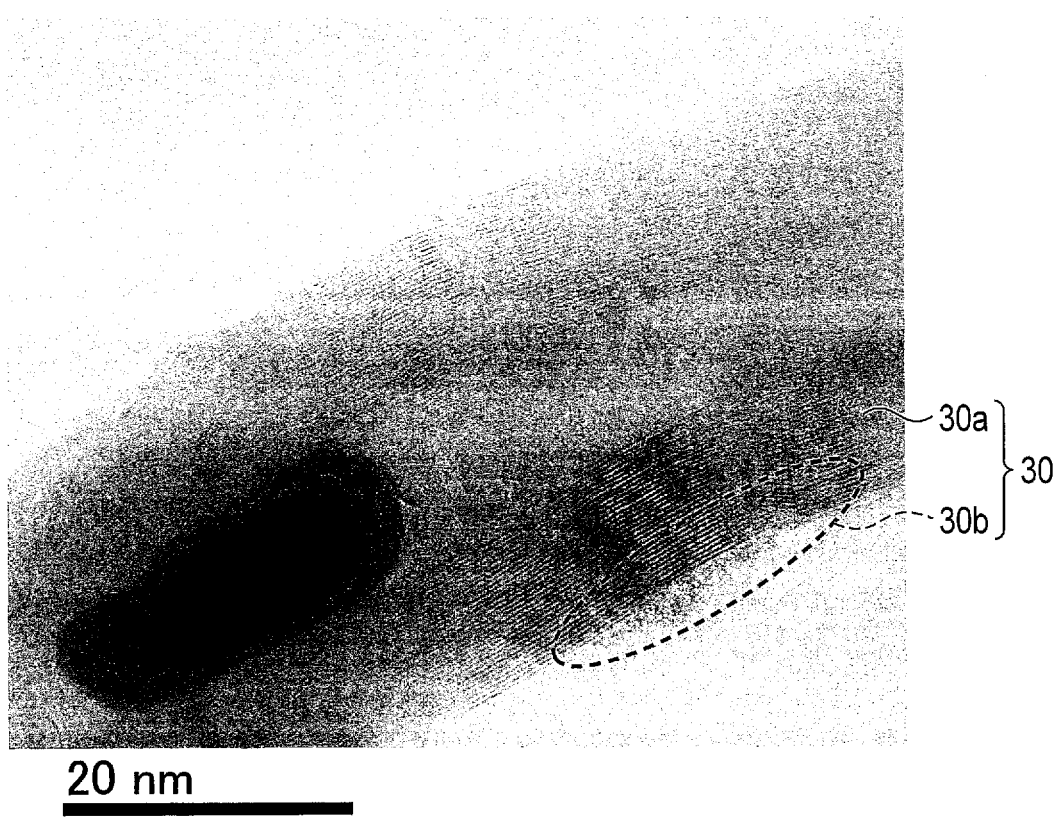
FIG. 8 is a scanning transmission electron micrograph of the porous composite produced in Example 12.
Figure 9:
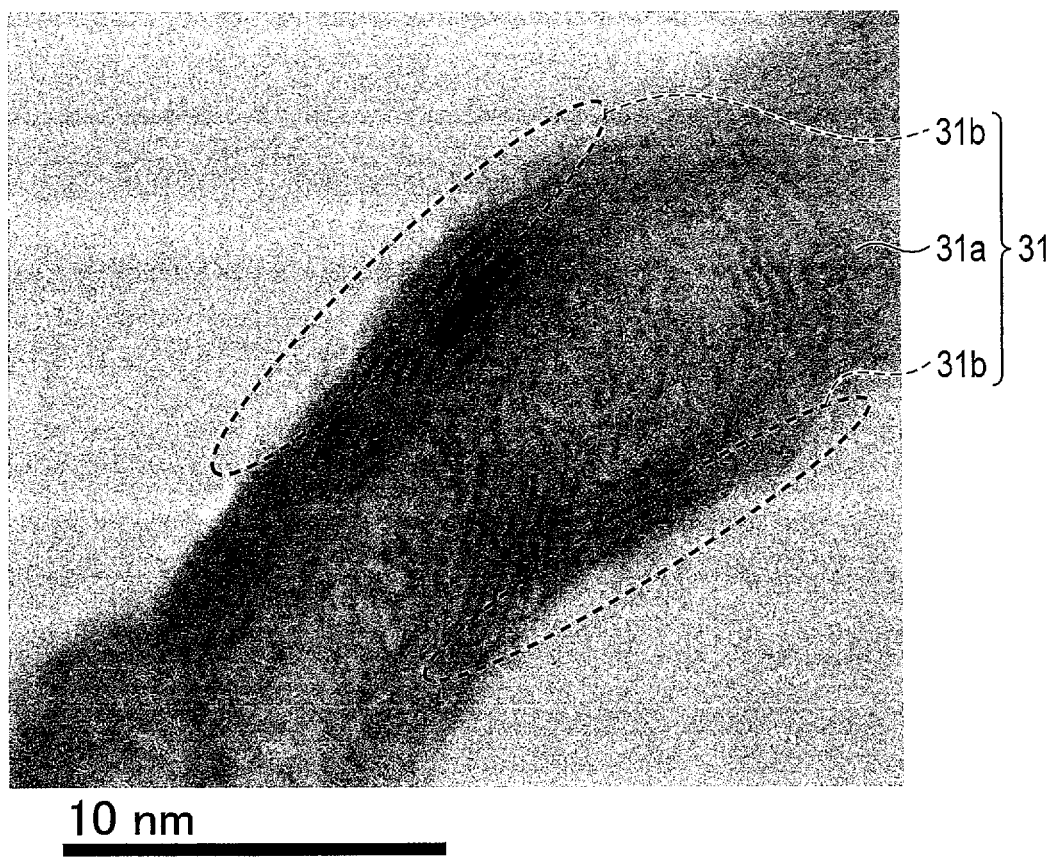
FIG. 9 is a scanning transmission electron micrograph of the porous composite produced in Example 2.

FIGS. 8 and 9 show obtained STEM images. From each figure, it can be seen that COF or MOF is present on the surface of the CNT since adherent matters clearly different from the CNT are present on the surface of the CNT. Specifically, in the AQ-MOF_CNT (porous composite of Example 12) 30 of which the STEM image is shown in FIG. 8, it can be clearly seen that an MOF 30b is present on the surface of a CNT 30a. Similarly, in the AQ-COF_CNT (porous composite of Example 2) 31 of which the STEM image is shown in FIG. 9, it can be clearly seen that a COF 31b is present on the surface of a CNT 31a.

<Measurement of Specific Surface Area>

The specific surface areas of the COF-CNT composites and MOF-CNT composites produced in Examples 1 to 15 and Comparative Examples 1 to 2 were measured by the procedure described above. Table 1 below shows the measurement results.

<Electrochemical Measurement>

Each of the devices produced in Examples 1 to 15 and Comparative Examples 1 to 2 was evaluated for electrochemical performance. Specifically, a test device using each of the produced devices was constructed and subjected to cyclic voltammetry (CV) measurement.

Figure 10:
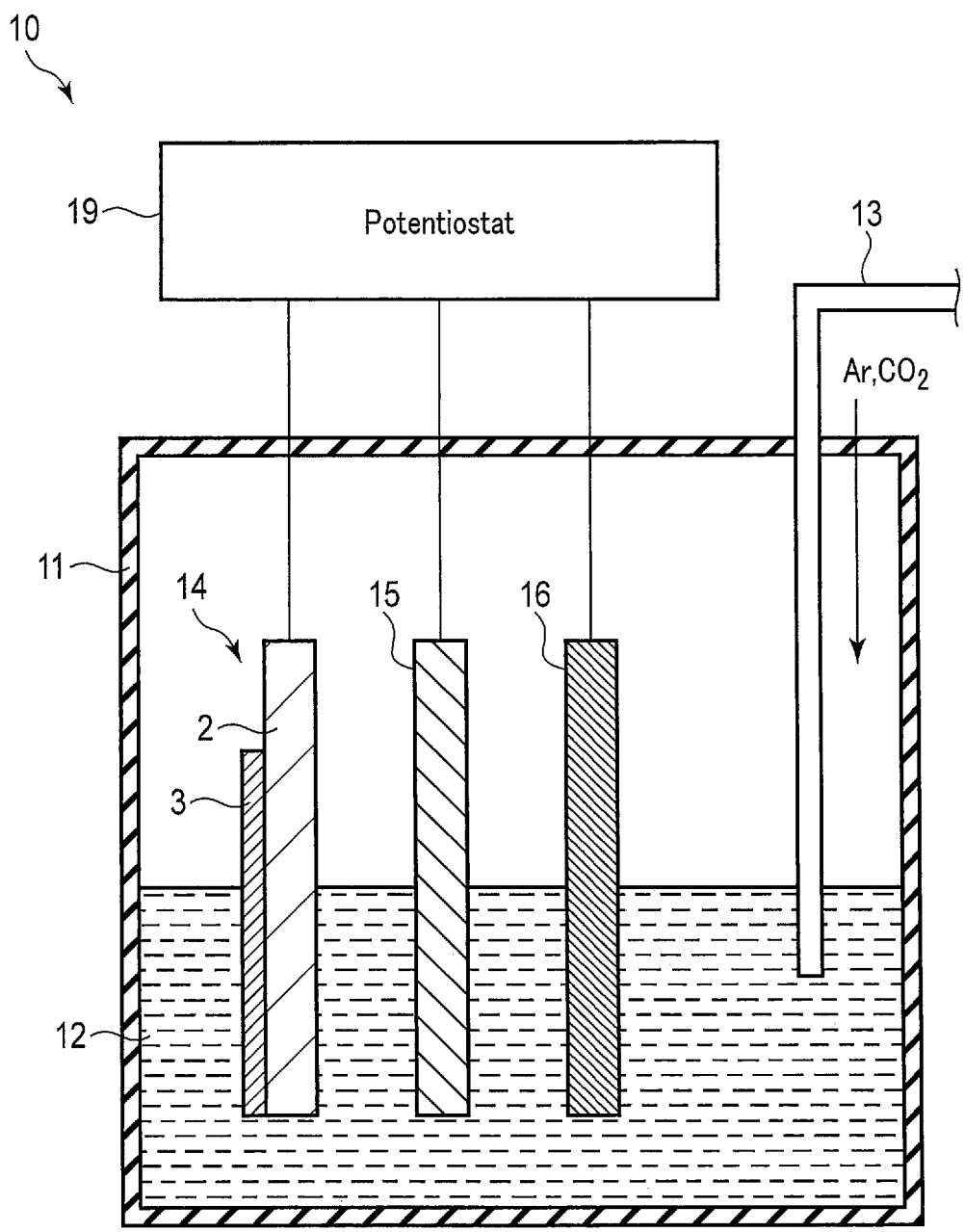
FIG. 10 is a cross-sectional view schematically showing an electrochemical cell used for evaluating electrochemical performance of carbon dioxide adsorption-desorption devices prepared in Examples.

The test device had a configuration of a three-electrode electrochemical cell. FIG. 10 is a schematic cross-sectional view of the test device. In the test device 10, each of the devices produced in Examples 1 to 16 and Comparative Examples 1 to 2 was used as a working electrode 14, a carbon electrode was used as a counter electrode 15, and an Ag/Ag$^+$ electrode (acetonitrile/0.1M (M: mol/l) TBAP solution/0.01 M AgNO$_3$) was used as a reference electrode 16 (tetrabutylammonium perchlorate (TBAP)). As the electrolytic solution 12, a 0.1M TBAP acetonitrile solution of was used.

Before the measurement, argon (Ar) gas was passed through a nozzle 13 into an electrolytic solution 12 within a glass cell 11 for about 30 minutes, and CV measurement was performed using a potentiostat 19. Subsequently, 100% carbon dioxide gas was passed through the nozzle 13 into the electrolytic solution 12 for about 30 minutes, and CV measurement was performed again. An immersed area (about 2 cm$^2$) of the device was measured, and the measured value was calculated per amount (g) of the composite (COF-CNT or MOF-CNT) present in the immersed area.

FIG. 11 shows the CV measurement result of the COF-CNT of Example 2 (DAAQ-TFP-COF-CNT) as a specific example. FIG. 11 is a graph showing cyclic voltammetry curves of the porous composite prepared in Example 2. In the graph, a curve during the first CV measurement under an Ar atmosphere is indicated by a broken line 21, and a curve during the second CV measurement under a CO$_2$ atmosphere is indicated by a solid line 20. As shown in the graph, an increase in the current value was confirmed under the CO$_2$ atmosphere as compared to that under the inert gas (Ar) atmosphere near −1.6 V (vs. Ag/Ag$^+$) and near −0.7 V (vs. Ag/Ag$^+$). Since the neighborhood of −1.6 V (vs. Ag/Ag$^+$) is the reduction potential at which the CO$_2$ adsorption reaction occurs and the neighborhood of −0.7 V (vs. Ag/Ag$^+$) is the oxidation potential at which the CO$_2$ desorption reaction occurs, the amount of CO$_2$ contributing to the electrochemical reaction (EC reaction) was calculated from the area where a tangent connecting the positions of minimum values or maximum values preceding and following each potential was drawn.

Table 1 below summarizes, for the devices produced in Examples 1 to 16 and Comparative Examples 1 to 2, the porous composites or the porous substances, the ionic liquid added as an electrolyte impregnated into the device, the specific surface areas of the porous composites measured as described above, and the amounts of CO$_2$ calculated from the CV measurement results. In Examples 1 to 16, since the COFs and MOFs as porous materials are made into composites with CNTs, they can be said to be synthesized "porous composites". On the other hand, in Comparative Examples 1 and 2, since the COFs and MOFs are merely mixed with the CNTs and not formed into composites, they can be said to be synthesized "porous substances", not porous composites.

TABLE 1

|  | Porous composite/ porous material | Ionic liquid added to be impregnated as electrolyte | Specific surface area (m$^2$/g) | Amount of CO$_2$ contributing to adsorption reaction (mmol/g) |
| --- | --- | --- | --- | --- |
| Example 1 | TpPA-(OH)$_2$-CNT | (no ionic liquid added) | 123 | 0.97 |
| Example 2 | DAAQ-TFP-COF-CNT | (no ionic liquid added) | 444 | 1.12 |
| Example 3 | 1KT-Tp COF-CNT | (no ionic liquid added) | 323 | 0.61 |
| Example 4 | 2KT-Tp COF-CNT | (no ionic liquid added) | 478 | 1.13 |
| Example 5 | 4KT-Tp COF-CNT | (no ionic liquid added) | 227 | 1.11 |
| Example 6 | TpPA-Py COF-CNT | (no ionic liquid added) | 219 | 0.50 |
| Example 7 | DAPH-TFP COF-CNT | (no ionic liquid added) | 385 | 1.08 |
| Example 8 | PI-COF-1-CNT | (no ionic liquid added) | 127 | 1.11 |
| Example 9 | PI-COF-2-CNT | (no ionic liquid added) | 458 | 1.03 |
| Example 10 | PI-COF-3-CNT | (no ionic liquid added) | 285 | 1.12 |
| Example 11 | DAAQ-TFP-COF-CNT | BMIM-Tf$_2$N solution | 403 | 1.21 |
| Example 12 | AQ-UiO-CNT | (no ionic liquid added) | 459 | 0.35 |
| Example 13 | AQ-UiO-CNT | BMIM-Tf$_2$N solution | 398 | 0.43 |
| Example 14 | Cu (2,7-AQDC)-CNT | (no ionic liquid added) | 211 | 0.37 |
| Example 15 | Mn (2,7-AQDC)-CNT | (no ionic liquid added) | 207 | 0.45 |
| Example 16 | DAAQ-TFP-COF-CNT-CNF | (no ionic liquid added) | 526 | 1.02 |
| Comparative Example 1 | DAAQ-TFP-COF | (no ionic liquid added) | 344 | 0.98 |
| Comparative Example 2 | AQ-UiO | (no ionic liquid added) | 356 | 0.22 |

It can be seen from the comparison between Example 2 and Comparative Example 1 and the comparison between Example 12 and Comparative Example 2 that obtaining a composite with CNT for each of a COF and MOF enhances the electro-conductivity and increases the CO$_2$ adsorption amount.

It can be said that COF can adsorb more CO$_2$ than MOF because of its high electro-conductivity, as demonstrated by comparison between Examples 1 to 11 and Examples 12 to 16. In addition, it can be seen from the comparison between Example 2 and Example 11 and the comparison between Example 12 and Example 13 that the electro-conductivity is further improved and the amount of $CO_2$ is increased for both a COF and an MOF, when the COF and the MOF hold an electrolyte such as an ionic liquid.

As described above, the theoretical maximum adsorption amount of $CO_2$ varies depending on the steric structures of MOF and COF and the number of redox-active points.

According to one or more embodiment and example described above, a carbon dioxide adsorption-desorption device is provided. The device includes an electrode that is provided with a porous composite including an electro-conductive component and a porous material on the electro-conductive component. The porous material has pores of an angstrom size or a nanometer size, and includes within the pores, a moiety exhibiting redox activity by electrical response. The device can efficiently absorb and release carbon dioxide with low energy, and can perform efficient gas separation of carbon dioxide.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide adsorption-desorption device comprising an electrode, the electrode comprising a porous composite, the porous composite comprising:
   an electro-conductive component; and
   a porous material covering the electro-conductive component with a thickness of 1 nm or more and 5 nm or less, the porous material having pores of an angstrom size or a nanometer size, and comprising a moiety exhibiting redox activity according to electrical response,
   wherein the porous composite is obtained by covering the surface of the electro-conductive component with the porous material,
   wherein the electro-conductive component is not covered with a porous material having a thickness of greater than 5 nm, and
   the porous material comprises a metal-organic framework with electrical activity, the metal-organic framework having a UiO structure, a Cu (2,7-anthraquinone dicarboxylic acid) structure, or a Mn (2,7-anthraquinone dicarboxylic acid) structure.

2. The carbon dioxide adsorption-desorption device according to claim 1, wherein the porous material is capable of adsorbing carbon dioxide in a reduction state and is capable of desorbing carbon dioxide in an oxidation state.

3. The carbon dioxide adsorption-desorption device according to claim 1, wherein the electro-conductive component has any one or more of a rod shape, a tubular shape, a fiber shape, a sheet shape, and a flake shape.

4. The carbon dioxide adsorption-desorption device according to claim 1, wherein the electro-conductive component includes one or more selected from the group consisting of carbon nanotube, graphite, graphene, carbon nanofiber, Ketjen black, polyaniline, polythiophene, and poly (3,4-ethylenedioxythiophene)-polystyrene sulfonate.

5. The carbon dioxide adsorption-desorption device according to claim 1, wherein the electro-conductive component comprises an electro-conductive material of a length less than 1 μm and an electro-conductive material of a length equal to or more than 1 μm.

6. The carbon dioxide adsorption-desorption device according to claim 1, further comprising an electrically non-conductive polymer.

7. The carbon dioxide adsorption-desorption device according to claim 1, further comprising an electrolyte held in the porous composite.

8. The carbon dioxide adsorption-desorption device according to claim 7, wherein the electrolyte comprises one or more selected from the group consisting of an ionic-bonding salt and an ion-conductive polymer.

9. The carbon dioxide adsorption-desorption device according to claim 8, wherein the electrolyte comprises the ionic-bonding salt, and the ionic-bonding salt comprises one or more selected from the group consisting of an alkali metal salt, an alkaline earth metal salt, a transition metal salt, an amphoteric metal salt, an ammonium salt, an imidazolium salt, a pyridinium salt, and a phosphonium salt.

10. The carbon dioxide adsorption-desorption device according to claim 8, wherein the electrolyte comprises the ion-conductive polymer, and the ion-conductive polymer comprises one or more selected from the group consisting of polyethylene oxide, polypropyl oxide, polyacrylonitrile, polyvinyl chloride, an ionic liquid polymer.

11. The carbon dioxide adsorption-desorption device according to claim 1, wherein the electrode further comprises a current collector provided with the porous composite, the current collector comprising one or more selected from the group consisting of glassy carbon, a graphite sheet, carbon felt, carbon cloth, a carbon mesh, carbon paper, a carbon sheet with a gas diffusion layer, a copper plate, a copper sheet, a copper mesh, an aluminum plate, an aluminum sheet, an aluminum mesh, a nickel plate, a nickel sheet, and a nickel mesh.

12. The carbon dioxide adsorption-desorption device according to claim 1, wherein coverage by the porous material on the electro-conductive component is less than 100%.

13. The carbon dioxide adsorption-desorption device according to claim 1, wherein the porous material covering the electro-conductive component is a layer different from the electro-conductive component, and the porous material is stacked on the surface of the electro-conductive component.

* * * * *